United States Patent
Akazaki et al.

(10) Patent No.: US 6,550,449 B2
(45) Date of Patent: Apr. 22, 2003

(54) CONTROL SYSTEM FOR INTERNAL COMBUSTION ENGINE

(75) Inventors: Shusuke Akazaki, Wako (JP); Yoshihisa Iwaki, Wako (JP); Masaki Ueno, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 207 days.

(21) Appl. No.: 09/741,837

(22) Filed: Dec. 22, 2000

(65) Prior Publication Data

US 2001/0047792 A1 Dec. 6, 2001

(30) Foreign Application Priority Data

Dec. 24, 1999 (JP) .......................................... 11-365710

(51) Int. Cl.[7] .............................................. F02D 41/16
(52) U.S. Cl. ................. 123/339.11; 123/339.1
(58) Field of Search .................. 123/339.1, 339.11, 123/339.19

(56) References Cited

U.S. PATENT DOCUMENTS 5,309,882 A * 5/1994 Hoshiba et al. ........ 123/339.11
5,497,745 A * 3/1996 Cullen et al. ........... 123/339.11
5,575,257 A * 11/1996 Lange et al. ........... 123/339.11
5,954,025 A * 9/1999 Kanamaru et al. ...... 123/179.16

FOREIGN PATENT DOCUMENTS

DE 197 29 087 A1 1/1999

* cited by examiner

Primary Examiner—John Kwon
(74) Attorney, Agent, or Firm—Arent Fox Kintner Plotkin & Kahn

(57) ABSTRACT

A control system for an internal combustion engine having a catalyst arranged in the exhaust system is disclosed. In the control system, catalyst temperature rise accelerating control is executed by increasing the intake air amount immediately after starting of the engine and retarding the ignition timing to make the rotational speed of the engine coincide with a target rotational speed. The air-fuel ratio of an air-fuel mixture supplied to the engine is controlled to a lean region with respect to the stoichiometric ratio immediately after starting of the engine. The degree of making the air-fuel ratio leaner is suppressed when the retard amount of the ignition timing during the execution of the catalyst temperature rise accelerating control is less than a predetermined retard amount.

10 Claims, 19 Drawing Sheets

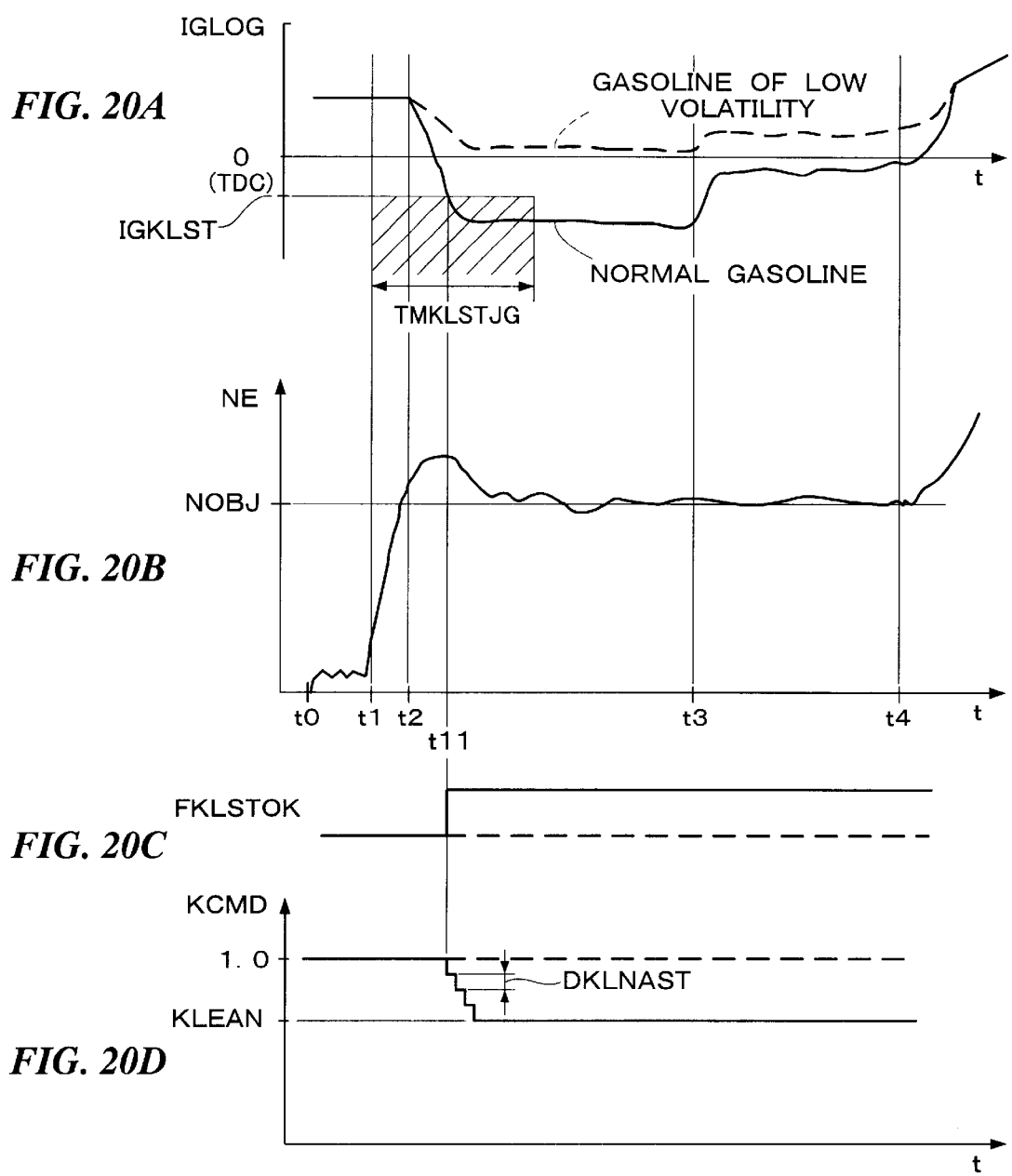

CONTROL SYSTEM FOR INTERNAL COMBUSTION ENGINE

BACKGROUND OF THE INVENTION

The present invention relates to a control system for an internal combustion engine that performs catalyst temperature rise acceleration control for accelerating a rise in temperature of a catalyst for exhaust gas purification, and more particularly to a control system for performing such a catalyst temperature rise acceleration control and a lean-burn control for making the air-fuel ratio leaner.

The catalyst disposed in the exhaust system of an internal combustion engine for purifying exhaust gases is inactive at low temperatures. Consequently, the catalyst does not purify the exhaust gases at low temperatures. Therefore, there have been known a method of making the air-fuel ratio leaner than the stoichiometric air-fuel ratio to reduce emission of HC immediately after starting of the engine and a method of retarding ignition timing to accelerate a temperature rise of the catalyst. There is also known a control system which detects a property (volatility) of the fuel being used and controls the degree of making the air-fuel ratio leaner or the retard amount of the ignition timing according to the detected property of the fuel (Japanese Patent Laid-open No. Hei 9-53492).

By controlling the degree of making the air-fuel ratio leaner according to the detected property of the fuel, it is possible to make air-fuel ratio leaner to the limit which is suitable for the property of the fuel being used, thus effectively reducing the emission of HC.

However, the conventional system needs a fuel property sensor disposed in a fuel pipe, a combustion pressure sensor disposed in cylinders, or a pressure sensor in a fuel tank. Accordingly, there has been a problem that the system becomes complicated in structure.

SUMMARY OF THE INVENTION

An object of the present invention is to provide a control system for an internal combustion engine, which performs a catalyst temperature rise acceleration control immediately after starting of the engine by increasing an intake air amount and retarding ignition timing, and also performs a lean-burn control for making the air-fuel ratio leaner in a manner suitable for the property of the fuel being used with a simpler structure, to thereby effectively increase the temperature of the catalyst early and reduce emission of HC.

To achieve the above object, according to a first aspect of the present invention, there is a control system for an internal combustion engine having an exhaust system provided with a catalyst. The control system includes an intake air amount control for controlling an intake air amount of the engine. An ignition timing control for controlling the ignition timing of the engine. A catalyst temperature rise accelerating device for increasing the intake air amount immediately after starting the engine and retarding the ignition timing to make a rotational speed of the engine coincide with a target rotational speed. A lean control device for controlling the air-fuel ratio of an air-fuel mixture supplied to the engine to a lean region with respect to the stoichiometric ratio immediately after starting of the engine. The lean control device reduces the degree of making the air-fuel ratio leaner when the retard amount of the ignition timing during the operation of the catalyst temperature rise accelerating means is less than a predetermined retard amount.

With this configuration, the intake air amount immediately after starting of the engine is increased and the ignition timing is retarded to make the rotational speed of the engine coincide with a target rotational speed by the catalyst temperature rise accelerating means. The air-fuel ratio of an air-fuel mixture supplied to the engine immediately after starting of the engine is also controlled to a lean region with respect the stoichiometric ratio by the lean control means. The degree of making the air-fuel ratio leaner by the lean control means is suppressed when the retard amount of the ignition timing during the operation of the catalyst temperature rise accelerating means is less than a predetermined retard amount. Consequently, the lean air-fuel ratio control suitable for the property of the fuel being used can be carried out without the need for a fuel property sensor, to thereby effectively realize an early temperature rise of the catalyst and reduction of HC emission.

Preferably, the lean control means sets the predetermined retard amount according to the temperature of the engine.

With this configuration, since the predetermined retard amount is set according to the temperature of the engine, a fuel of low volatility can accurately be determined irrespective of the temperature of the engine.

Preferably, the lean control means sets the degree of making the air-fuel ratio leaner, according to the temperature of the engine and the load on the engine.

Preferably, the lean control means has averaging means for averaging a load parameter value indicative of the load on the engine, and sets the degree of making the air-fuel ratio leaner, using an averaged value calculated by the averaging means when the load parameter value is greater than the averaged value by a predetermined value.

Preferably, the lean control means has combustion state parameter calculating means for calculating a combustion state parameter indicative of the combustion state of the engine, and the lean control means suppresses the degree of making the air-fuel ratio leaner when the combustion state parameter indicates deterioration of the combustion state.

According to a second aspect of the present invention, there is provided a control system for an internal combustion engine having an exhaust system provided with a catalyst. The control system includes an intake air amount control for controlling an intake air amount of the engine. An ignition timing control controls the ignition timing of the engine. A catalyst temperature rise accelerator increases the intake air amount immediately after starting of the engine and retards the ignition timing to make a rotational speed of the engine coincide with a target rotational speed. A lean control device controls the air-fuel ratio of an air-fuel mixture supplied to the engine to a lean region with respect to a stoichiometric ratio immediately after starting of the engine. The lean control means has a fuel property determining device for determining a property of the fuel being used according to the retard amount of the ignition timing during the operation of the catalyst temperature rise accelerating means, and controls the degree of making the air-fuel ratio leaner according to the property of the fuel determined by the fuel property determining means.

With this configuration, the intake air amount immediately after starting of the engine is increased and the ignition timing is retared to make the rotational speed of the engine coincide with a target rotational speed by the catalyst temperature rise accelerating means, and the air-fuel ratio of an air-fuel mixture supplied to the engine immediately after starting of the engine is controlled to a lean region with respect the stoichiometric ratio by the lean control means. The property of the fuel being used is determined according to the retard amount of the ignition timing during the operation of the catalyst temperature rise accelerating means, and controls the degree of making the air-fuel ratio leaner according to the determined property of the fuel. Consequently, the lean air-fuel ratio control suitable for the property of the fuel being used can be carried out with simpler structure, to thereby effectively realize an early temperature rise of the catalyst and reduction or HC emission.

Preferably, the fuel property determining means determines the property of the fuel within a predetermined determination period (TMKLSTJG) from the completion of starting of the engine.

BRIEF DESCRIPTION OF THE DRAWINGS

FIGS. 20A, 20B, 20C, and 20D are timing charts illustrating the lean control permission determination processing shown in FIG. 17 by comparing a gasoline of low volatility and an normal gasoline.

DETAILED DESCRIPTION OF THE PREFERRED EMBODIMENT

Hereinafter, a preferred embodiment of the present invention will now be described with reference to the drawings.

Figure 1:
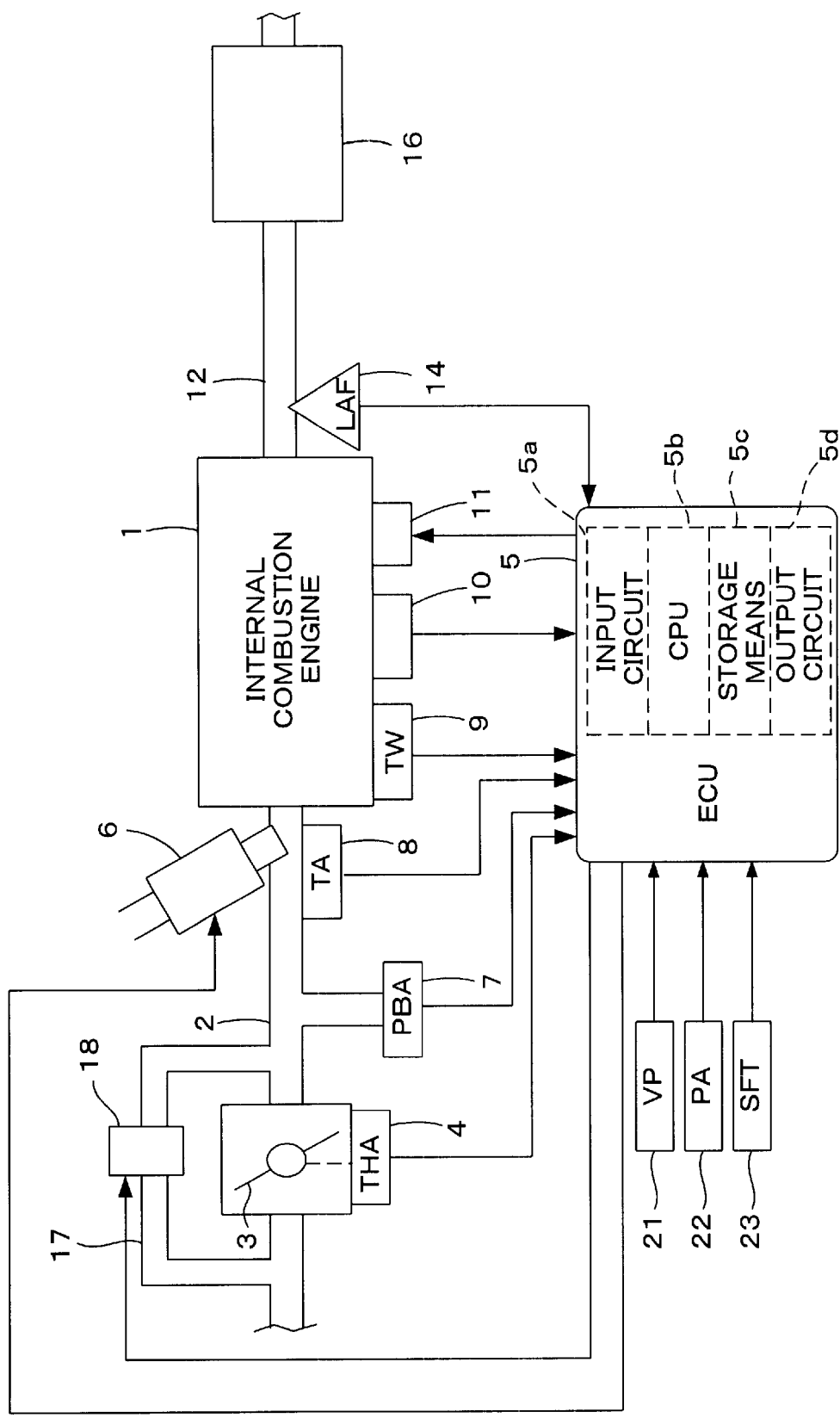
FIG. 1 is a schematic diagram showing the configuration of an internal combustion engine and a control system therefor according to a first preferred embodiment of the present invention.

Referring to FIG. 1, there is schematically shown a general configuration of an internal combustion engine (which will be hereinafter referred to as "engine") and a control system therefor according to a preferred embodiment of the present invention. The engine 1 is a four-cylinder engine, for example, and it has an intake pipe 2 provided with a throttle valve 3. A throttle valve opening (THA) sensor 4 is connected to the throttle valve 3, so as to output an electrical signal corresponding to an opening angle of the throttle valve 3 and supply the electrical signal to an electronic control unit (which will be hereinafter referred to as "ECU") 5.

An auxiliary air passage 17, which bypasses the throttle valve 3, is connected to the intake pipe 2. The auxiliary air passage 17 is provided with an auxiliary air control valve 18 for controlling an auxiliary air amount. The auxiliary air control valve 18 is connected to the ECU 5, and its valve opening amount is controlled by the ECU 5.

A fuel injection valve 6 is provided for each cylinder so as to inject fuel into the intake pipe 2. Thus, four fuel injection valves 6 would be respectively provided for a four cylinder engine. The fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 7 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 7 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature) TW. A temperature signal corresponding to the detected engine coolant temperature TW is output from the sensor 9 and supplied to the ECU 5.

A crank angle position sensor 10 for detecting a rotational angle of a crankshaft (not shown) of the engine 1 is connected to the ECU 5, and a signal corresponding to the detected rotational angle of the crankshaft is supplied to the ECU 5. The crank angle position sensor 10 consists of a cylinder discrimination sensor for outputting a signal pulse at a predetermined crank angle position for a specific cylinder of the engine 1 (this signal pulse will be hereinafter referred to as "CYL signal pulse"). The crank angle position sensor 10 also consists of a TDC sensor for outputting a TDC signal pulse at a crank angle position before a top dead center (TDC) by a predetermined crank angle starting at an intake stroke in each cylinder (at every 180 deg crank angle in the case of a four-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

Each cylinder of the engine 1 is provided with a spark plug 11. The spark plug 11 is connected to the ECU 5, and a drive signal for the spark plug 11, i.e., an ignition signal, is supplied from the ECU 5 to the spark plug 11.

An exhaust pipe 12 of the engine 1 is provided with a three-way catalyst 16 for removing components such as HC, CO, and NOx in exhaust gases. A proportional type air-fuel ratio sensor (which will be hereinafter referred to as "LAF sensor") 14 is mounted on the exhaust pipe 12 at a position upstream of the three-way catalyst 16. The LAF sensor 14 outputs a detection signal substantially proportional to the oxygen concentration (air-fuel ratio) in the exhaust gases, and supplies the detection signal to the ECU 5.

A vehicle speed sensor 21 for detecting a running speed (vehicle speed) VP of a vehicle driven by the engine 1 is connected to the ECU 5. An atmospheric pressure sensor 22 for detecting an atmospheric pressure PA is also connected to the ECU 5. A shift position sensor 23 for detecting a shift position of an automatic transmission in the vehicle is also connected to the ECU 5. Detection signals output from these sensors 21, 22, and 23 are supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values. ECU 5 also includes a central processing unit (which will be hereinafter referred to as "CPU") 5b and storage means 5c. Storage means 5c preliminarily stores various operational programs to be executed by the CPU 5b and stores the results of computation or the like made by the CPU 5b. Additionally, ECU5 includes an output circuit 5d for supplying drive signals to the fuel injection valves 6, the spark plugs 11, etc.

The CPU 5b determines various engine operating conditions according to various engine parameter signals as mentioned above, and calculates a fuel injection period TOUT for each fuel injection valve 6 to be opened in synchronism with the TDC signal pulse, in accordance with Eq. (1) and according to the above determined engine operating conditions.

$$TOUT=TI \times KCMD \times KLAF \times K1 + K2 \quad (1)$$

TI is a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. Accordingly, the basic fuel injection period TI has values proportional to an intake air amount per unit time. Thus, an accumulated intake air amount parameter GAIRSUM to be hereinafter described can be obtained by accumulating the basic fuel injection period TI.

KCMD is a target air-fuel ratio coefficient, which is set according to engine operational parameters such as the engine rotational speed NE, the absolute intake pressure PBA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, so KCMD is also referred to as a target equivalent ratio.

KLAF is an air-fuel ratio correction coefficient calculated by PID (proportional integral differential) control so that a detected equivalent ratio KACT calculated from a detected value output from the LAF sensor 14 becomes equal to the target equivalent ratio KCMD. In an engine operating condition where a control (air-fuel ratio feedback control) according to the detected equivalent ratio KACT is not performed (e.g. immediately after starting of the engine 1), the air-fuel ratio correction coefficient KLAF is set to 1.0 (non-correction value).

The CPU 5b further calculates an ignition timing IGLOG in accordance with Eq. (2).

$$IGLOG=IGMAP+IGCR+IGFPI \quad (2)$$

IGMAP is a basic value of the ignition timing obtained by retrieving an IG map set according to the engine rotational speed NE and the absolute intake pressure PBA. The ignition timing is indicated by an advance amount from a top dead center.

IGFPI is a retard correction term set to a negative value so that the engine rotational speed NE becomes equal to a target rotational speed NEFIR in executing rapid warm-up retard control during warming up of the engine 1.

IGCR is a correction term other than the retard correction term IGFPI. (IGMAP+IGCR) corresponds to an ignition timing in the case of normal control without the execution of the rapid warm-up retard control.

In the following description, an operational mode in which the rapid warm-up retard control is executed will be referred to as "FIRE mode".

The CPU 5b supplies a signal for driving each fuel injection valve 6 according to the fuel injection period TOUT obtained above to each fuel injection valve 6, and also supplies a signal for driving each spark plug 11 according to the ignition timing IGLOG obtained above. Further, the CPU 5b calculates a valve opening control amount ICMD for controlling the valve opening amount of the auxiliary air control valve 18 according to engine operating conditions, and supplies a drive signal corresponding to the valve opening control amount ICMD calculated above to the auxiliary air control valve 18. In the FIRE mode (and in a transient state immediately after the end of the FIRE mode), the CPU 5b calculates the valve opening control amount ICMD in accordance with Eq. (3). The amount of air supplied through the auxiliary air control valve 18 into the engine 1 is proportional to the valve opening control amount ICMD.

$$ICMD=(IFIR+ILOAD) \times KIPA+IPA \quad (3)$$

IFIR is a FIRE mode control term used in the FIRE mode (and in the transient state immediately after the end of the FIRE mode). ILOAD is a load correction term set according to whether various loads such as an electrical load, a compressor load of an air conditioner, and a power steering load on the engine 1 are ON or OFF or whether or not the automatic transmission is in an in-gear condition.

KIPA and IPA are an atmospheric pressure correction coefficient and an atmospheric pressure correction term both set according to the atmospheric pressure PA, respectively.

Figure 2:
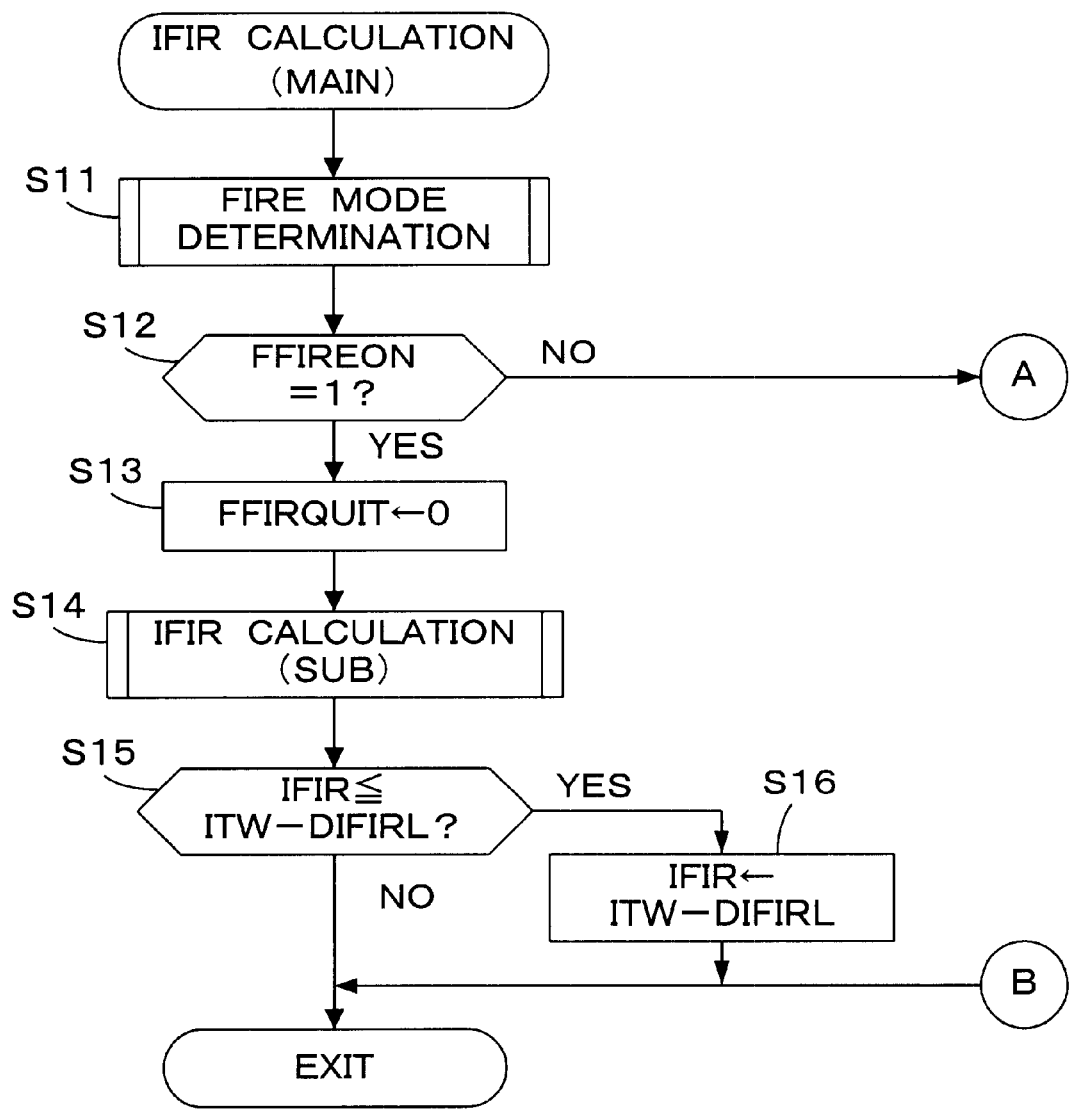
FIGS. 2 and 3 are flowcharts showing a main routine for calculation of a control amount (IFIR) of an auxiliary air control valve according to the first preferred embodiment.
Figure 3:
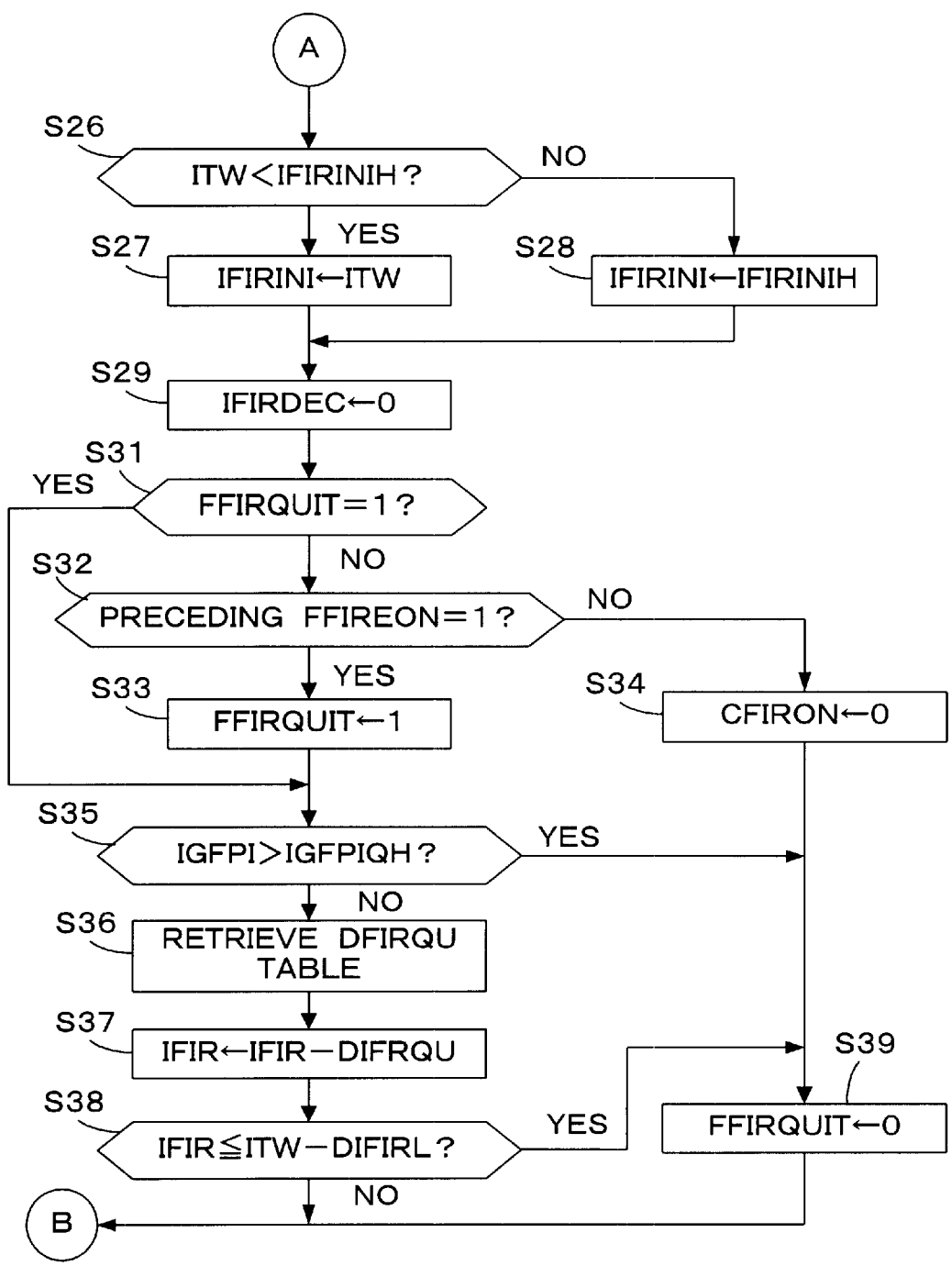

FIGS. 2 and 3 are flowcharts showing a main routine for calculation of the FIRE mode control term IFIR in the FIRE mode and immediately after the end of the FIRE mode. This routine is executed in synchronism with the generation of a TDC signal pulse in the CPU 5b.

Figure 5:
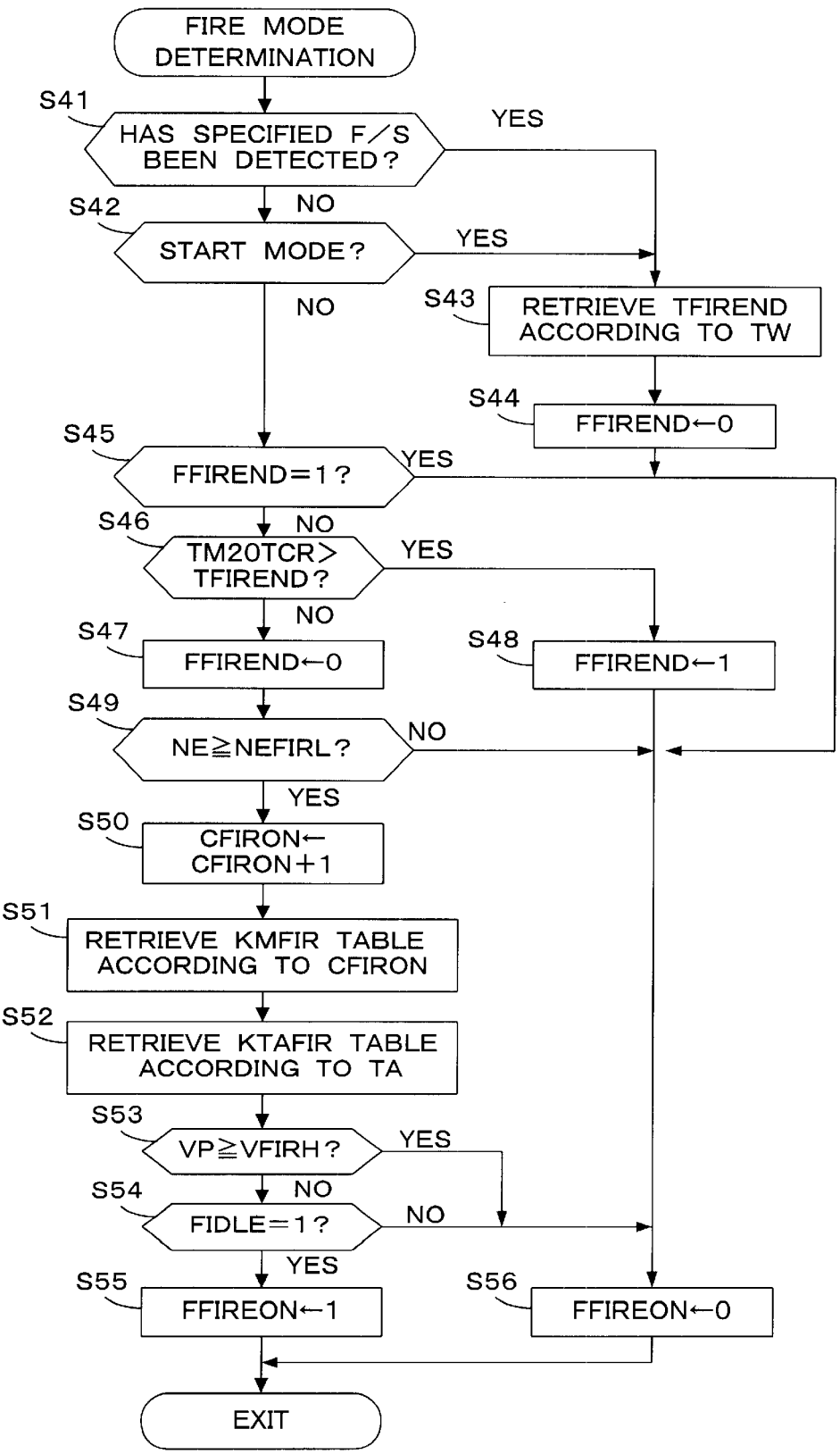
FIG. 5 is a flowchart showing a program for determining whether or not catalyst temperature rise acceleration control is to be executed.

In step S11, FIRE mode determination processing shown in FIG. 5 is executed. The FIRE mode determination processing includes steps of setting a FIRE mode flag FFIREON to "1", indicating permission to transition to the FIRE mode or continuation of the FIRE mode.

Figure 7:
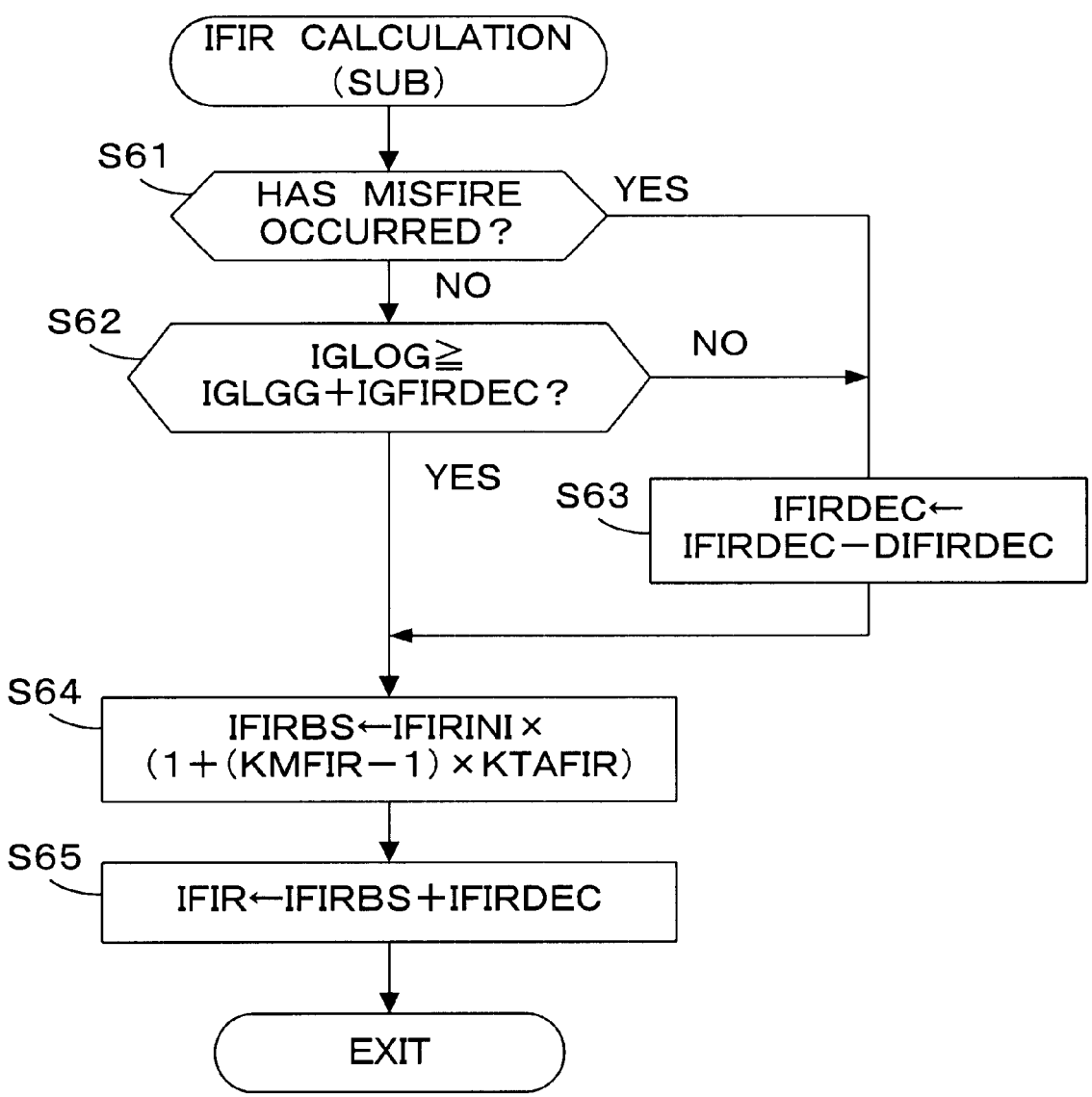
FIG. 7 is a flowchart showing a subroutine for calculation of the control amount (IFIR) of the auxiliary air control valve.

In step S12, it is determined whether or not the FIRE mode flag FFIREON is "1". If FFIREON is "0", which indicates that the transition to the FIRE mode or the continuation of the FIRE mode is not allowed, then the program proceeds to step S26 (FIG. 3). When FFIREON is "1", a transient control flag FFIRQUIT is set to "0" (step S13), and an IFIR calculation subroutine shown in FIG. 7 is executed (step S14). The transient control flag FFIRQUIT of "1" indicates the duration of execution of transient control immediately after the end of the FIRE mode. Thereafter, it is determined whether or not the FIRE mode control term IFIR calculated in step S14 is less than or equal to a lower limit obtained by subtracting DIFIRL from ITW. DIFIRL is a predetermined value for lower limit setting (e.g., a value corresponding to an air amount of 100 liters/min). ITW is an engine coolant temperature control term set according to the engine coolant temperature TW. The engine coolant temperature control term ITW is a control term used for control of the auxiliary air control valve 18 in an engine operating condition such as an idling operation other than the FIRE mode (step S15). If IFIR is greater than ITW minus DIFIRL, the program is ended. When IFIR is less than or equal to ITW minus DIFIRL, the FIRE mode control term IFIR is set to the lower limit (ITW−DIFIRL) (step S16) and the program is then ended.

In step S26 shown in FIG. 3, it is determined whether or not the engine coolant temperature control term ITW is less than an upper limit initial value IFIRINIH (e.g., a value corresponding to an intake air amount of 600 liters/min). If ITW is less than IFIRINIH, an initial value IFIRINI, used in step S64 shown in FIG. 7, is set to the engine coolant temperature control term ITW (step S27). When ITW is greater than or equal to IFIRINIH, the initial value IFIRINI is set to the upper limit initial value IFIRINIH (step S28).

In step S29, a subtraction correction value IFIRDEC, updated in step S63 and used in step S65 both shown in FIG. 7, is set to "0". Thereafter, it is determined whether or not the transient control flag FFIRQUIT is "1" (step S31). If FFIRQUIT is "1", which indicates that the transient control is being performed, the program proceeds directly to step S35. If FFIRQUIT is "0", which indicates that the transient control is not being performed, it is determined whether or not the FIRE mode flag FFIREON was "1" at the preceding cycle (at the preceding execution of this processing) (step S32). If the preceding FFIREON was "1", which indicates a condition immediately after the end of the FIRE mode, the transient control flag FFIRQUIT is set to "1" (step S33), and the program proceeds to step S35.

If the preceding FFIREON was 0 in step S32, a FIRE mode on-counter CFIRON is set to "0" (step S34), and the transient control flag FFIRQUIT is set to "0" (step S39). CFIRON is a counter that is incremented in step S50 shown in FIG. 5 to count the number of repetitions of the FIRE mode. Then, the program is ended.

In step S35, it is determined whether or not the retard correction term IGFPI of the ignition timing IGLOG is greater than a threshold IGFPIQH (e.g., −3 deg) for determination of ending of the transient control. If IGFPI is greater than IGFPIQH, which indicates that the absolute value of the retard correction term IGFPI is small (the retard amount is small), the program proceeds to step S39, so as to end the transient control.

Figure 4:
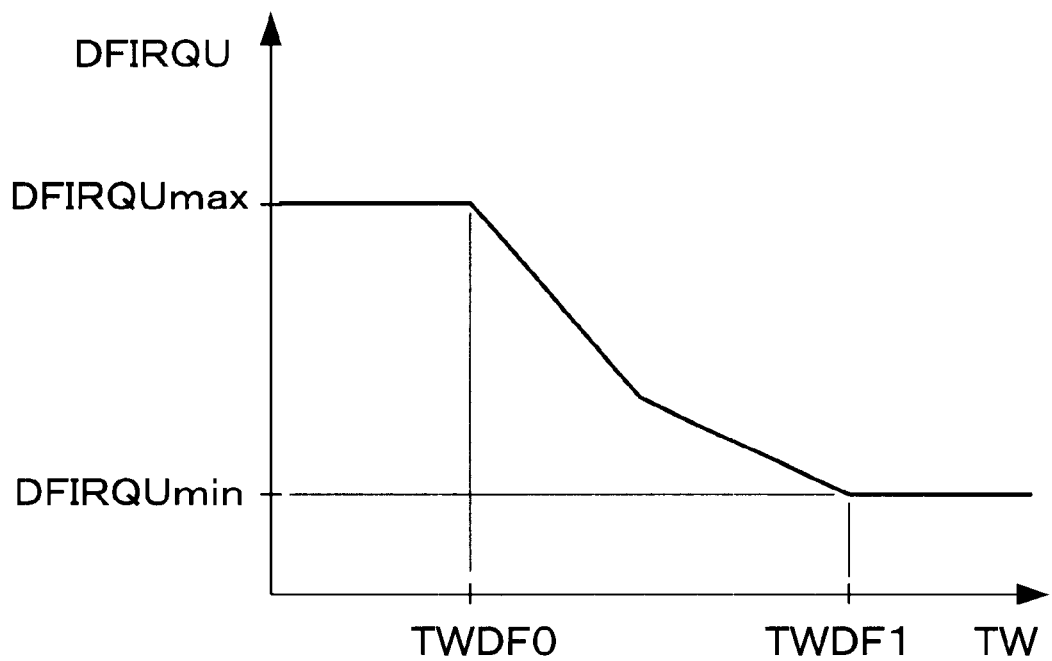
FIG. 4 is a graph showing a table used in the processing shown in FIG. 3.

If IGFPI is less than or equal to IGFPIQH in step S35, a DFIRQU table shown in FIG. 4 is retrieved according to the engine coolant temperature TW to calculate a transient control subtraction value DFIRQU (step S36). The DFIRQU table is set so that the transient control subtraction value DFIRQU decreases with an increase in the engine coolant temperature TW. In FIG. 4, DFIRQUmax and DFIRQUmin are set to a value corresponding to an intake air amount of 5 liters/min and a value corresponding to an intake air amount of 2 liters/min, respectively, for example, and TWDF0 and TWDF1 are set to 28 degrees Centigrade and 62 degrees Centigrade, respectively, for example.

In step S37, the FIRE mode control term IFIR is decremented by the transient control subtraction value DFIRQU. Thereafter, it is determined whether or not the FIRE mode control term IFIR is less than or equal to the lower limit obtained by subtracting the predetermined value DIFIRL from the engine coolant temperature control term ITW (step S38). If IFIR is greater than ITW minus DIFIRL, the program is ended. When IFIR is less than or equal to ITW minus DIFIRL, step S39 is executed and the program is then ended.

As mentioned above, the processing shown in FIG. 3 executes the steps of setting the initial value IFIRINI of the FIRE mode control term IFIR (steps S26 to S28), the steps of the transient control immediately after the end of the FIRE mode (steps S31 to S38), and the steps of initialization of the parameters used in the control to be hereinafter described (steps S29 and S34). By executing the transient control, the intake air amount increased in the FIRE mode is gradually returned to a value in the normal control.

Figure 6A:
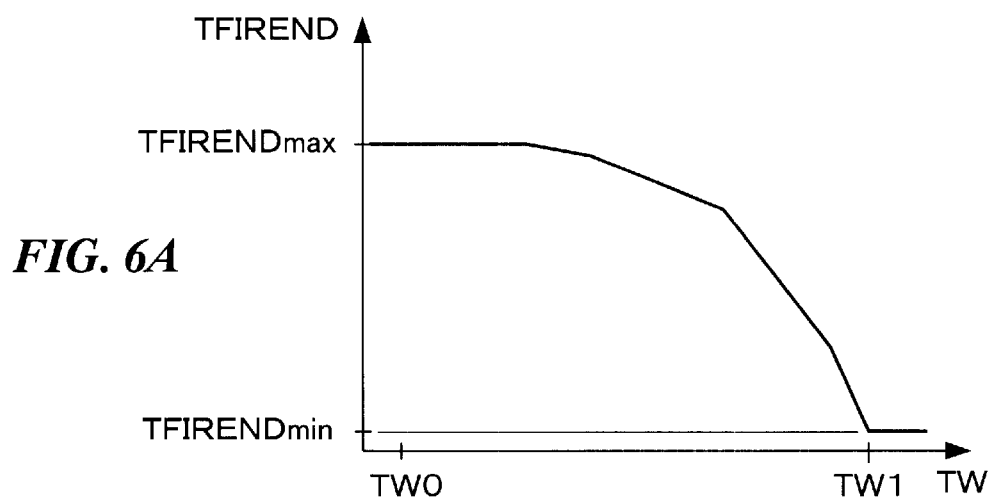
FIGS. 6A to 6C are graphs showing tables used in the processing shown in FIG. 5.

FIG. 5 is a flowchart showing the FIRE mode determination processing executed in step S11 shown in FIG. 2. In step S41, it is determined whether or not a specified failure has already been detected. If the specified failure has not been detected, it is determined whether or not the engine 1 is at starting (at cranking) (step S42). If the answer to either step S41 or S42 is affirmative (YES), a TFIREND table shown in FIG. 6A is retrieved according to the engine coolant temperature TW to determine a FIRE mode end time TFIREND referred in step S46 to be hereinafter described (step S43). The TFIREND table is set so that the FIRE mode end time TFIREND decreases with an increase in the engine coolant temperature TW In FIG. 6A, TFIRENDmax and TFIRENDmin are set to 50 seconds and 2 seconds, respectively, for example, and TW0 and TW1 are set to −10 degrees Centigrade and 75 degrees Centigrade, respectively, for example.

In step S44, an end flag FFIREND is set to "0", a value of "1" indicates the ending of the FIRE mode. Thereafter, the FIRE mode flag FFIREON is set to "0" (step S56), and the program is ended.

If the answers to steps S41 and S42 are both negative (NO), it is determined whether or not the end flag FFIREND is "1" (step S45). If FFIREND is "1", the program proceeds directly to step S56. When FFIREND is "0", the value of an upcount timer TM20TCR is compared to the FIRE mode end time TFIREND calculated in step S43 (step S46). Upcount timer TM20TCR is started when engine 1 is started (when cranking is finished) and measures the elapsed time since engine 1 started. When TM20TCR is greater than TFIREND, the end flag FFIREND is set to "1", so as to end the FIRE mode (step S48), and the program proceeds to step S56.

Figure 6B:
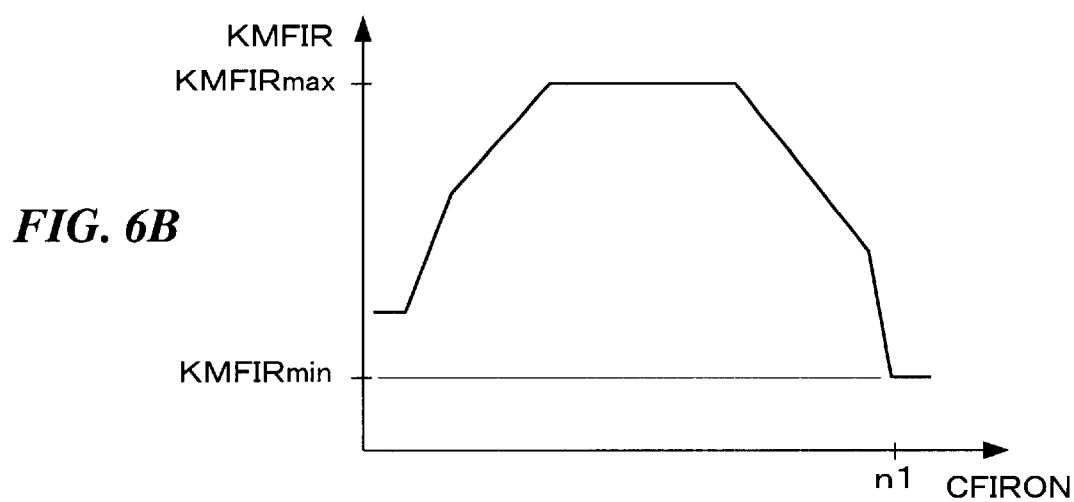

If TM20TCR is less than or equal to TFIREND in step S46, the end flag FFIREND is set to "0" (step S47), and it is determined whether or not the engine rotational speed NE is greater than or equal to a predetermined lower limit rotational speed NEFIRL (e.g., 700 rpm) (step S49). If NE is less than NEFIRL, the program proceeds to step S56. When NE is greater than or equal to NEFIRL, the FIRE mode on-counter CFIRON is incremented by "1" (step S50). Then a KMFIR table shown in FIG. 6B is retrieved according to the value of the counter CFIRON to calculate a continuation time correction coefficient KMFIR used in the processing shown in FIG. 7 (step S51). The KMFIR table is set so that the correction coefficient KMFIR initially increases with an increase in the value of the counter CFIRON and after KMFIR reaching a maximum value, KMFIR may decrease with a further increase in the value of the counter CFIRON. In FIG. 6B, KMFIRmax and KMFIRmin are set to 2.625 and 1.0, respectively, for example, and n1 is set to 2000, for example.

Figure 6C:
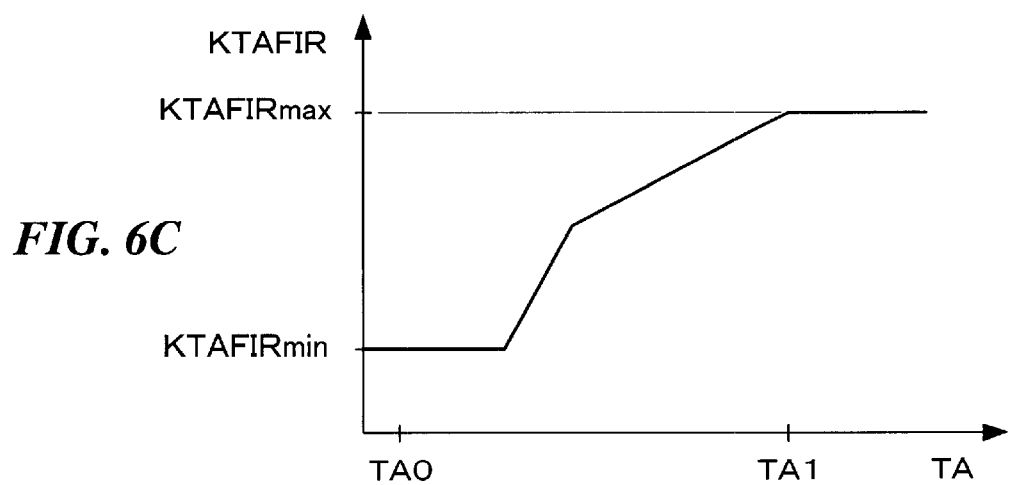

In step S52, a KTAFIR table shown in FIG. 6C is retrieved according to the intake air temperature TA to calculate an intake air temperature correction coefficient KTAFIR used in the processing shown in FIG. 7. The KTAFIR table is set so that the correction coefficient KTAFIR increases with an increase in the intake air temperature TA. In FIG. 6C, KTAFIRmax and KTAFIRmin are set to 2.0 and 1.0, respectively, for example, and TA0 and TA1 are set to −10 degrees Centigrade and 80 degrees Centigrade, respectively, for example.

In step S53, it is determined whether or not the vehicle speed VP is greater than or equal to a predetermined vehicle speed VFIRH (e.g., 5 km/h). If VP is less than VFIRH, it is determined whether or not an idle flag FIDLE is "1", this flag set to "1" indicates that engine 1 is idling (step S54). If VP is greater than or equal to VFIRH, which indicates that the vehicle is running, or if FIDLE is "0", which indicates that the engine 1 is not in the idling condition, the program proceeds to step S56, in which the FIRE mode flag FFIREON is set to "0". On the other hand, if VP is less than VFIRH and the engine 1 is in the idling condition, the FIRE mode flag FFIREON is set to "1" (step S55), and the program is then ended.

FIG. 7 is a flowchart showing the IFIR calculation subroutine of step S14 shown in FIG. 2. In step S61, it is determined whether or not the occurrence of misfire has been detected. The occurrence of misfire is detected by a known method according to fluctuations in period of generation of the CRK signal pulse which is generated at every crank angle of 30 deg. When the occurrence of misfire has not been detected, it is determined whether or not the ignition timing IGLOG is greater than or equal to a value obtained by adding a sticking determination value IGFIRDEC (e.g., 1 deg) and a lower limit IGLGG (e.g., −20 deg) (step S62). When the occurrence of misfire has not been detected and IGLOG is greater than or equal to the sum of IGLGG and IGFIRDEC, the program proceeds to step S64. If the occurrence of misfire has been detected or IGLOG is less than the sum of IGLGG and IGFIRDEC, which indicates that the ignition timing IGLOG sticks to a value in the vicinity of the lower limit IGLGG, a subtraction correction value IFIRDEC (<0) used in step S65 is decremented by a predetermined amount DIFIRDEC (step S63), and the program next proceeds to step S64.

In step S64, a basic value IFIRBS of the FIRE mode control term IFIR is calculated in accordance with Eq. (4).

$$IFIRBS = IFIRINI \times [1 + (KMFIR - 1) \times KTAFIR] \quad (4)$$

KMFIR and KTAFIR are the continuation time correction coefficient and the intake air temperature correction coefficient calculated in steps S51 and S52 shown in FIG. 5, respectively. The continuation time correction coefficient KMFIR changes with time elapsed from the start of the FIRE mode (an increase in the value of the counter CFIRON) as shown in FIG. 6B, so that the intake air amount is basically controlled so as to gradually increase from the start of the FIRE mode, subsequently gradually decrease, and subsequently maintain a substantially constant value (see FIG. 13A).

IFIRINI is the initial value set in step S27 or S28 shown in FIG. 3.

In step S65, the subtraction correction value IFIRDEC updated in step S63 is added to the basic value IFIRBS calculated in step S64 to calculate the FIRE mode control term IFIR. By adding the subtraction correction value IFIRDEC (<0), the intake air amount decreases when a misfire is detected or when the ignition timing IGLOG sticks to a value in the vicinity of the lower limit. Thereby avoiding the possibility that the discharge of unburned fuel may increase or that the retard correction of the ignition timing IGLOG may become impossible (the engine rotational speed NE cannot be made equal to the target rotational speed NEFIR).

Figure 8:
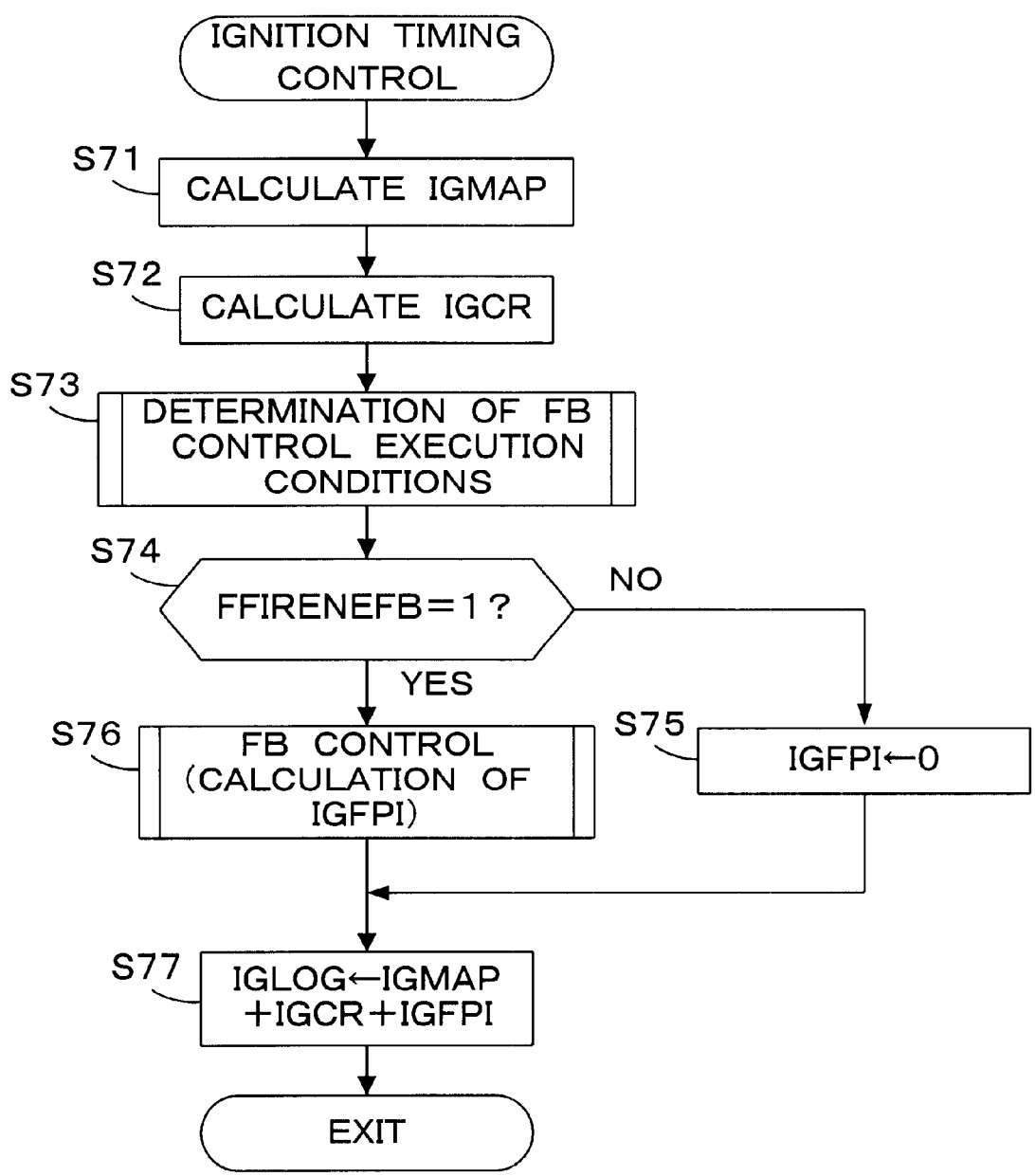
FIG. 8 is a flowchart showing a main routine for execution of ignition timing control.

FIG. 8 is a flowchart showing ignition timing control processing, and this processing is executed in synchronism with the generation of a TDC signal pulse in the CPU 5b.

Figure 9:
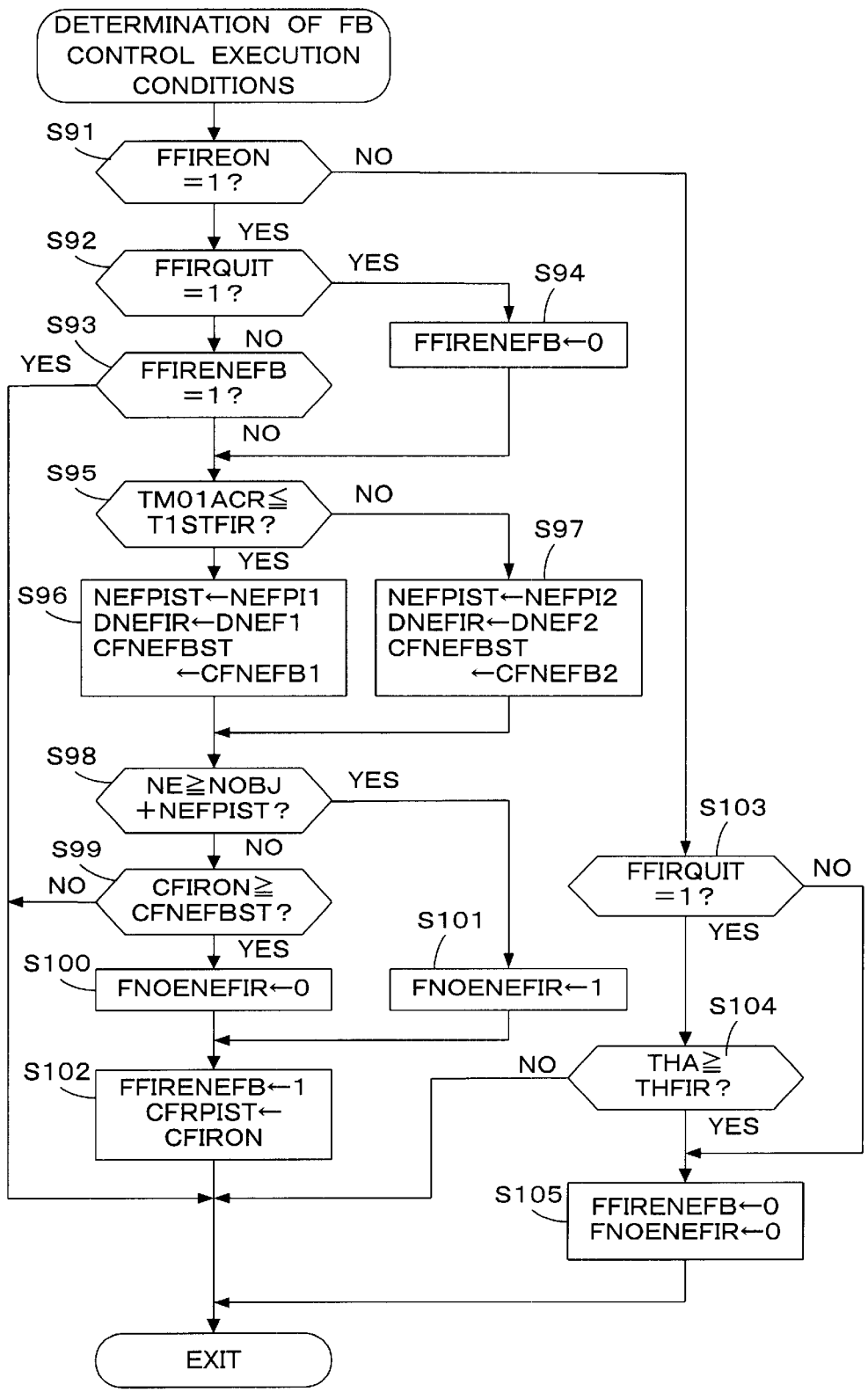
FIG. 9 is a flowchart showing a program for determining execution conditions of feedback control for ignition timing.

In step S71, a basic ignition timing IGMAP is calculated according to the engine rotational speed NE and the absolute intake pressure PBA. Thereafter, a correction term IGCR other than the retard correction term IGFPI is calculated (step S72). In step S73, a processing of determination of feedback (FB) control execution conditions, which is shown in FIG. 9, is executed. This processing is performed to determine execution conditions of feedback control for controlling the ignition timing so that the detected engine rotational speed NE coincides with the target rotational speed NEFIR for the FIRE mode. If the execution conditions are satisfied, a feedback control flag FFIRENEFB is set to "1".

In step S74, it is determined whether or not the feedback control flag FFIRENEFB is "1". If FFIRENEFB is "0", the retard correction term IGFPI is set to "0" (step S75). When FFIRENEFB is "1", which indicates that the execution conditions are satisfied, the feedback control is executed to set the retard correction term IGFPI according to the engine rotational speed NE (step S76).

In step S77, the ignition timing IGLOG is calculated in accordance with Eq. (2) mentioned above. Then, the program is ended.

FIG. 9 is a flowchart showing the processing for determination of the FB control execution conditions executed in step S73 shown in FIG. 8. In step S91, it is determined whether or not the FIRE mode flag FFIREON is "1". If FFIREON is "0", which indicates that the FIRE mode is off, it is determined whether or not the transient control flag FFIRQUIT is "1" (step S103). When FFIRQUIT is "0", which indicates that the transient control is off, both the feedback control flag FFIRENEFB and a target rotational speed flag FNOENEFIR are set to "0" (Step 105). If the target rotational speed flag FNOENEFIR's "1", this indicates that there was no increase in the target rotational speed during the feedback control (see step S131 in FIG. 12). Then, the program is ended.

If FFIRQUIT is "1" in step S103, which indicates that the transient control is on, it is determined whether or not the throttle valve opening THA is greater than or equal to a predetermined valve opening THFIR (e.g., 0.88 deg) (step S104). If THA less that THFIR, which indicates that the throttle valve is in a substantially fully closed condition, the program is ended. When THA is greater than or equal to THFIR, the program proceeds to step S105. In the case that the program is ended directly from step S104, FFIRENEFB of "1" is maintained even if FFIREON is "0", thus continuing the feedback control.

If FFIREON is "1" in step S91, it is determined whether or not the transient control flag FFIRQUIT is "1" (step S92). If FFIRQUIT is "1", the feedback control flag FFIRENEFB is set to "0" (step S94), and the program proceeds to step S95. If FFIRQUIT is "0", it is determined whether or not the feedback control flag FFIRENEFB has already been set to "1" (step S93). If FFIRENEFB is "1", the program is ended. When FFIRENEFB is "0", the program proceeds to step S95.

In step S95, it is determined whether or not the value of an upcount timer TM01ACR is less than or equal to a predetermined time T1STFIR (e.g., 1 msec). If TM01ACR is less than or equal to T1STFIR, which indicates that the engine 1 has just started, an addition value NEFPIST for feedback control start determination, an addition value DNEFIR for target rotational speed correction, and a count value CFNEFBST for feedback control start determination are set to first values NEFPI1 (e.g., 200 rpm), DNEF1 (e.g., 1 rpm), and CFNEFB1 (e.g., 200), respectively (step S96). When TM01ACR is greater than T1STFIR, the addition value NEFPIST, the addition value DNEFIR, and the count value CFNEFBST are set to second values NEFPI2 (e.g., 200 rpm), DNEF2 (e.g., 12 rpm), and CFNEFB2 (e.g., 2), respectively (step S97).

In step S98, it is determined whether or not the engine rotational speed NE is higher than or equal to a value obtained by adding the addition value NEFPIST for feedback control start determination and a target rotational speed NOBJ for the normal control. If NE is less than the sum of NOBJ and NEFPIST, it is determined whether or not the value of the FIRE mode on-counter CFIRON is greater than or equal to the count value CFNEFBST for feedback control start determination (step S99). When the answers to steps S98 and S99 are both negative (NO), which indicates that the engine rotational speed NE is low and the FIRE mode continuation time is short, the feedback control is not executed and the program is accordingly ended.

If NE is greater than or equal to the sum of NOBJ and NEFPIST in step S98, the target rotational speed flag FNOENEFIR is set to "1" (step S101). When CFIRON is greater than or equal to CFNEFBST in step S99, the target rotational speed flag FNOENEFIR is set to "0" (step S100). After executing step S101 or S100, the program proceeds to step S102. Accordingly, if the engine rotational speed NE at starting the feedback control is high (NE is greater than or equal to (NOBJ+NEFPIST)), a target rotational speed addition value ENEFIR used for calculation of the target rotational speed NEFIR for the FIRE mode is set to "0" (see FIG. 12 and steps S117 and S118 in FIG. 10).

In step S102, the feedback control flag FFIRENEFB is set to "1", and the value of the FIRE mode on-counter CFIRON is stored as a stored value CFRPIST.

Figure 10:
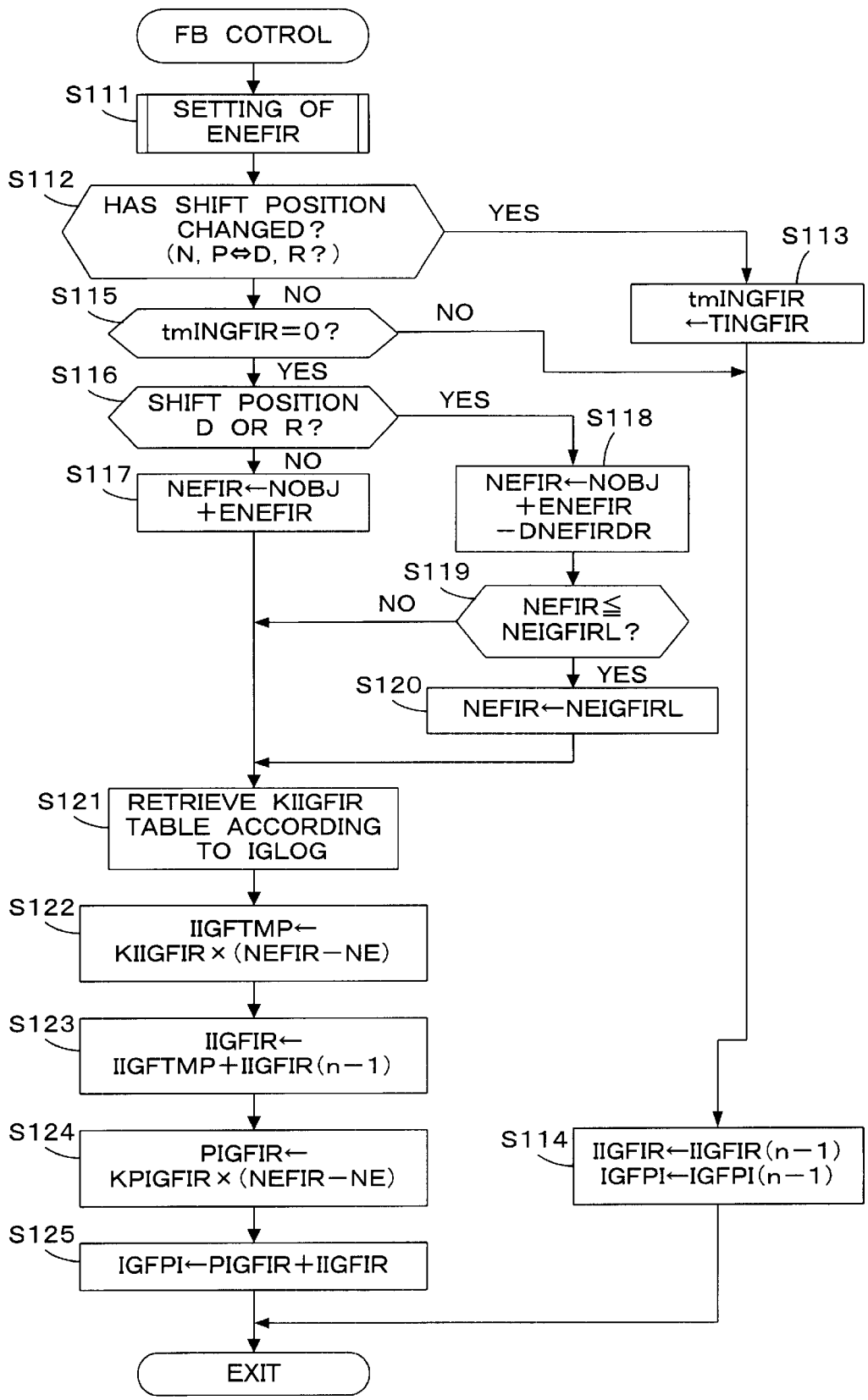
FIG. 10 is a flowchart showing a program for executing the feedback control for the ignition timing.

FIG. 10 is a flowchart showing the feedback control processing executed in step S76 shown in FIG. 8. In step S111, the processing of setting the target rotational speed addition value ENEFIR (FIG. 12) is executed to set the addition value ENEFIR.

In step S112, it is determined whether or not the shift position SFT of the automatic transmission has been changed from a neutral position N or a parking position P to a drive position D or a reverse position R (in-gear condition) or vice versa. If the shift position has been changed, a predetermined time TINGFIR (e.g., 3 seconds) is set to a downcount timer tmINGFIR referred in step S115, and the downcount timer tmINGFIR is started (step S113). Thereafter, the preceding values of both an integral term IIGFIR(n-1) and a retard correction term IGFPI(n-1) in the feedback control are held as present values IIGFIR and IGFPI (step S114) and the program is ended.

If the shift position has not been changed in step S112, it is determined whether or not the value of the timer tmING-FIR started in step S113 is "0" (step S115). If tmINGFIR is greater than 0, the program proceeds to step S114. If tmINGFIR is equal to 0, it is determined whether or not the shift position SFT is the drive position D or the reverse position R (in-gear condition) (step S116). When the shift position SFT is not in the in-gear condition, the target rotational speed NEFIR is calculated in accordance with Eq. (5) (step S117), and the program proceeds to step S121.

$$NEFIR=NOBJ+ENEFIR \quad (5)$$

NOBJ is the target rotational speed at idling in a normal mode (other than the FIRE mode).

ENEFIR is the target rotational speed addition value calculated in step S111.

If the shift position SFT is the drive position D or the reverse position R, i.e., the shift position SFT is in the in-gear condition in step S116, the target rotational speed NEFIR is calculated in accordance with Eq. (6) (step S118).

$$NEFIR=NOBJ+ENEFIR-DNEFIRDR \quad (6)$$

DNEFIRDR is an in-gear condition correction value set to 300 rpm, for example.

In step S119, it is determined whether or not the target rotational speed NEFIR for the FIRE mode is less than or equal to a lower limit NEIGFIRL (e.g., 730 rpm). If NEFIR is greater than NEIGFIRL, the program proceeds directly to step S121. When NEFIR is less than or equal to NEIGFIRL, the target rotational speed NEFIR is set to the lower limit NEIGFIRL (step S120), and the program next proceeds to step S121.

Figure 11:
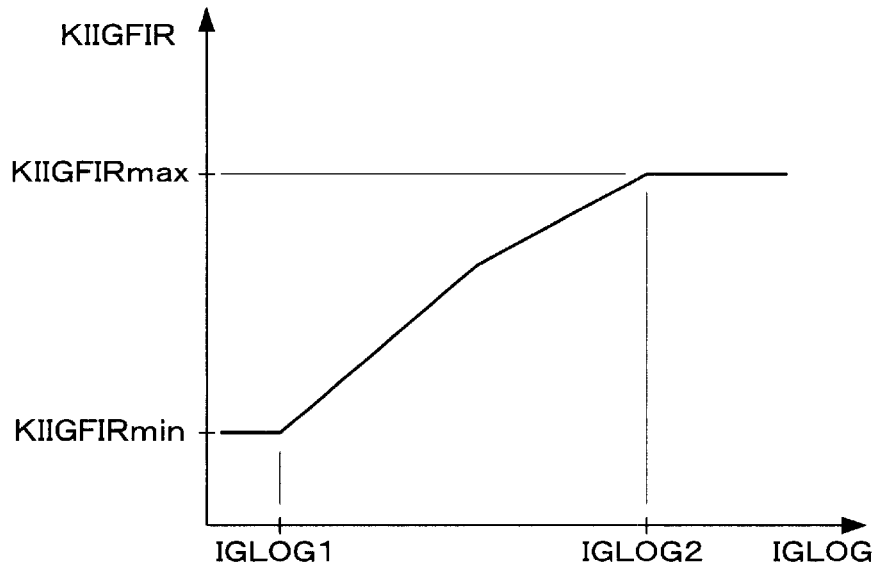
FIG. 11 is a graph showing a table used in the processing shown in FIG. 10.

In step S121, a KIIGFIR table shown in FIG. 11 is retrieved according to the ignition timing IGLOG to calculate an integral term gain KIIGFIR. The KIIGFIR table is set so that the integral term gain KIIGFIR increases with an increase (advance) in the ignition timing IGLOG. In FIG. 11, KIIGFIRmax and KIIGFIRmin are set to 0.063 and 0.016, respectively, for example, and IGLOG1 and IGLOG2 are set to -10 deg and 12 deg, respectively, for example.

In step S122, the engine rotational speed NE, the target rotational speed NEFIR for the FIRE mode, and the integral term gain KIIGFIR are applied to Eq. (7) to calculate an addition value IIGFTMP $$IIGFTMP=KIIGFIR \times (NEFIR-NE) \quad (7)$$

In step S123, the addition value IIGFTMP is added to the preceding value IIGFIR(n-1) of the integral term to calculate the integral term (present value) IIGFIR. Thereafter, a proportional term PIGFIR is calculated in accordance with Eq. (8) (step S124).

$$PIGFIR=KPIGFIR \times (NEFIR-NE) \quad (8)$$

Thereafter, the integral term IIGFIR and the proportional term PIGFIR are added to calculate a retard correction term IGFPI (step S125), and the program is ended.

By the processing of FIG. 10, the feedback control is executed to calculate the retard correction term IGFIR so that the engine rotational speed NE coincides with the target rotational speed NEFIR for the FIRE mode.

Figure 12:
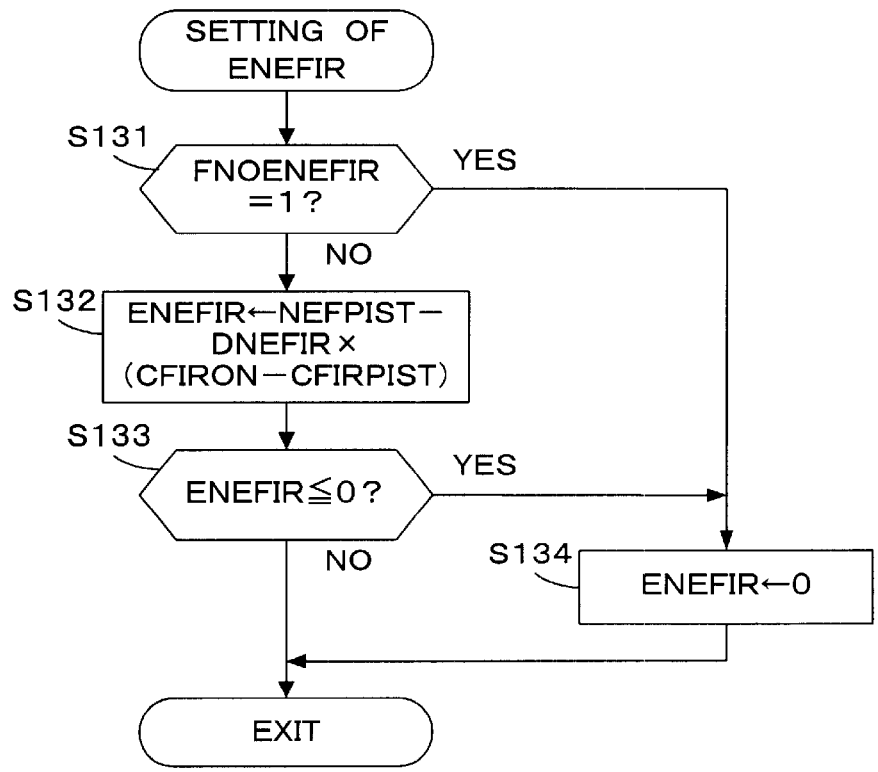
FIG. 12 is a flowchart showing a program for setting an addition value (ENEFIR) for a target engine rotational speed in the catalyst temperature rise acceleration control.

FIG. 12 is a flowchart showing the processing of setting ENEFIR executed in step S111 shown in FIG. 10. In step S131, it is determined whether or not the target rotational speed flag FNOENEFIR is "1". If FNOENEFIR is "1", which indicates that the target rotational speed is not to be increased, the target rotational speed addition value ENEFIR is set to "0" (step S134), and the program is ended.

If FNOENEFIR is "0", the addition value ENEFIR is calculated in accordance with Eq. (9) (step S132).

$$ENEFIR = NEFPIST - DNEFIR \times (CFIRON - CFIRPIST) \quad (9)$$

NEFPIST and DNEFIR are the addition value for feedback control start determination and the addition value for target rotational speed correction set in step S96 or S97, respectively and shown in FIG. 9. CFIRON is the value of the FIRE mode on-counter.

CFIRPIST is the value stored in step S102 shown in FIG. 9. The difference between CFIRON and CFIRPIST is a count value corresponding to the elapsed time after starting of the feedback control. Accordingly, the target rotational speed NEFIR for the FIRE mode is set so that it becomes equal to the sum of NOBJ and NEFPIST at the start of the feedback control and that it gradually decreases with elapsed time until finally reaching the target rotational speed NOBJ for the normal control according to Eq. (9) and Eq. (5) or (6) (see FIG. 13C).

In step S133, it is determined whether or not the addition value ENEFIR is less than or equal to 0. If ENEFIR is less than or equal to 0, the program proceeds to step S134. When ENEFIR is greater than 0, the program is ended.

Figures 13A, 13B, 13C:
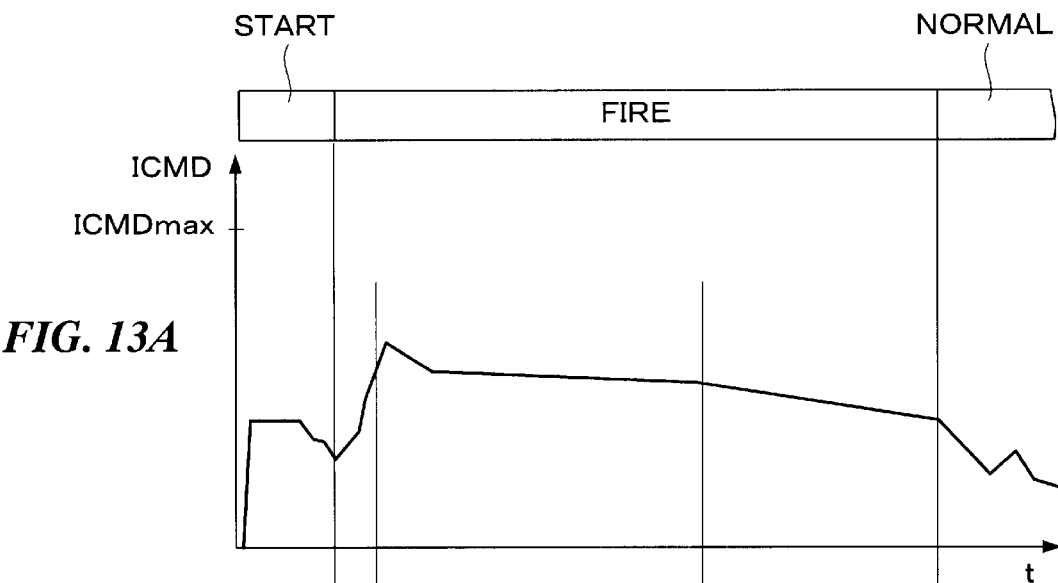
FIGS. 13A to 13C are time charts for illustrating the operation in executing the catalyst temperature rise acceleration control.

FIGS. 13A, 13B, and 13C are time charts for illustrating the intake air amount control and the ignition timing control mentioned above. FIG. 13A shows changes in the valve opening control amount ICMD of the auxiliary air control valve 18. FIG. 13B shows changes in the ignition timing IGLOG. FIG. 13C shows changes in the engine rotational speed NE.

In the example shown in FIGS. 13A to 13C, the engine 1 is started at the time t0 (i.e., cranking is started at the time t0), and the engine 1 starts running (self sustaining operation) at the time t1. At time t1, the FIRE mode is started. After starting the FIRE mode, the engine rotational speed NE is increased, and the execution conditions of the feedback control for ignition timing are satisfied at the time t2. Consequently, feedback control is started. As mentioned above, the target rotational speed NEFIR for the FIRE mode is equal to the sum of NOBJ and NEFPIST at the beginning of the FIRE mode, and is thereafter gradually decreased to the target rotational speed NOBJ for normal control.

The valve opening control amount ICMD is controlled so that it is gradually increased after starting the FIRE mode and then decreased. Immediately after the FIRE mode is ended at the time t4, the transient control is performed to gradually decrease the valve opening control amount ICMD.

The retard correction term IGFPI changes as shown by a broken line in FIG. 13B, and the ignition timing IGLOG is controlled to be retarded from the normal control value (IGMAP+IGCR). When the shift position SFT is changed from the neutral position N to the in-gear condition at the time t3, the engine load increases and the retard correction term IGFPI is therefore increased (the retard amount is decreased) to increase the output torque of the engine 1. At the same time, the engine rotational speed NE is maintained at the target rotational speed NEFIR which equals NOBJ. After the time t4, the ignition timing IGLOG is controlled to gradually approach the normal control value.

During the time period between t2 and t4, the engine rotational speed NE is controlled so as to coincide with the target rotational speed NEFIR by the feedback control. In the example shown in FIGS. 13A to 13C, the vehicle is started immediately after the time t4, and the vehicle speed VP is gradually increased.

Figure 14:
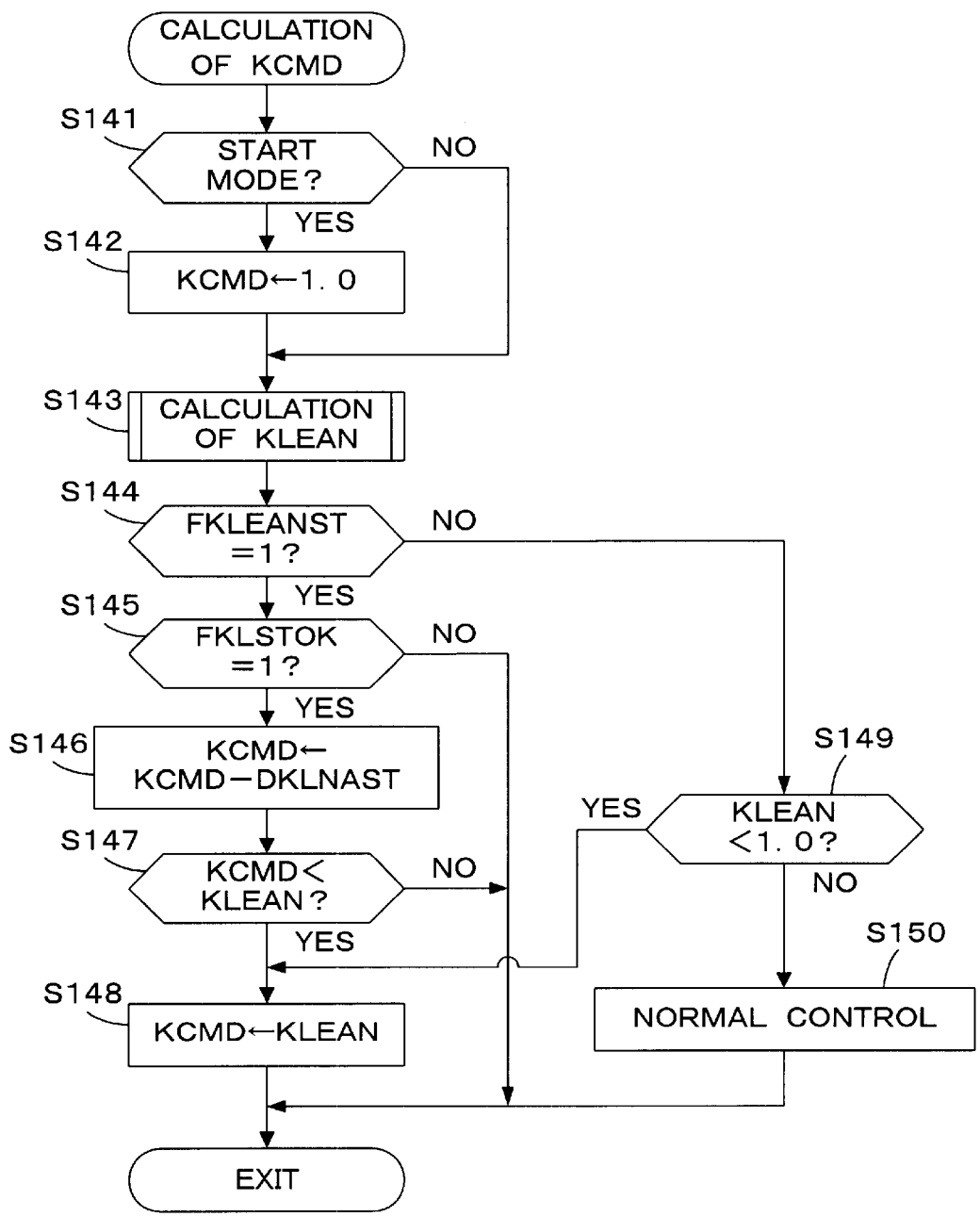
FIG. 14 is a flowchart showing a program for setting a target air-fuel ratio coefficient (KCMD)

FIG. 14 is a flowchart showing a processing for calculating the target air-fuel ratio coefficient KCMD in Eq. (1). This processing is executed in synchronism with the generation of a TDC signal pulse by the CPU 5b.

Step S141 of FIG. 14 determines whether or not the engine 1 is staring. If the engine 1 is starting, then the target air-fuel ratio coefficient KCMD is set to "1.0" in step S142. If the engine 1 is not at starting, then the program moves to step S143.

Figure 15:
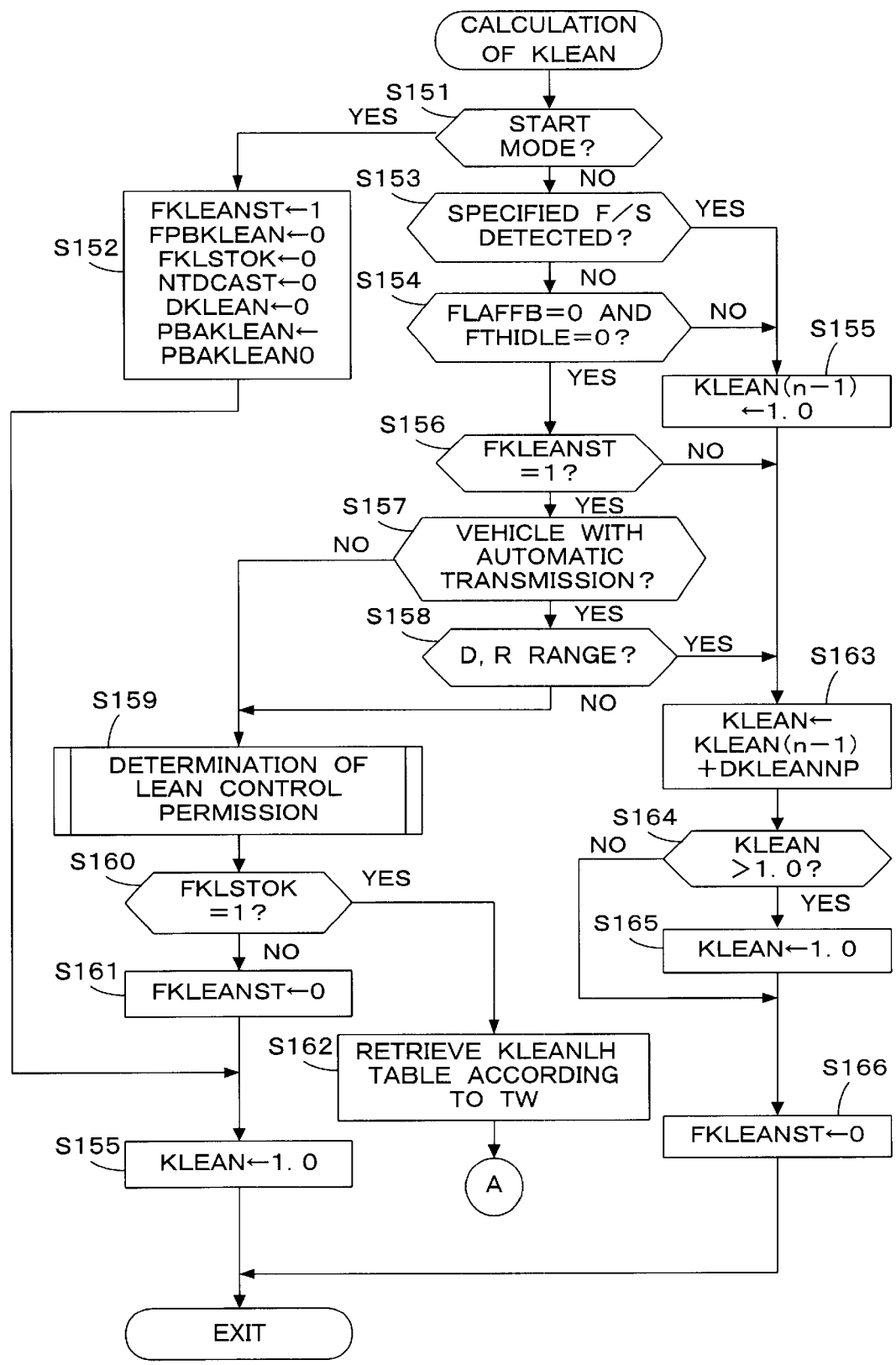
FIG. 15 is a flowchart showing a program for calculating a lean control coefficient (KLEAN)
Figure 16:
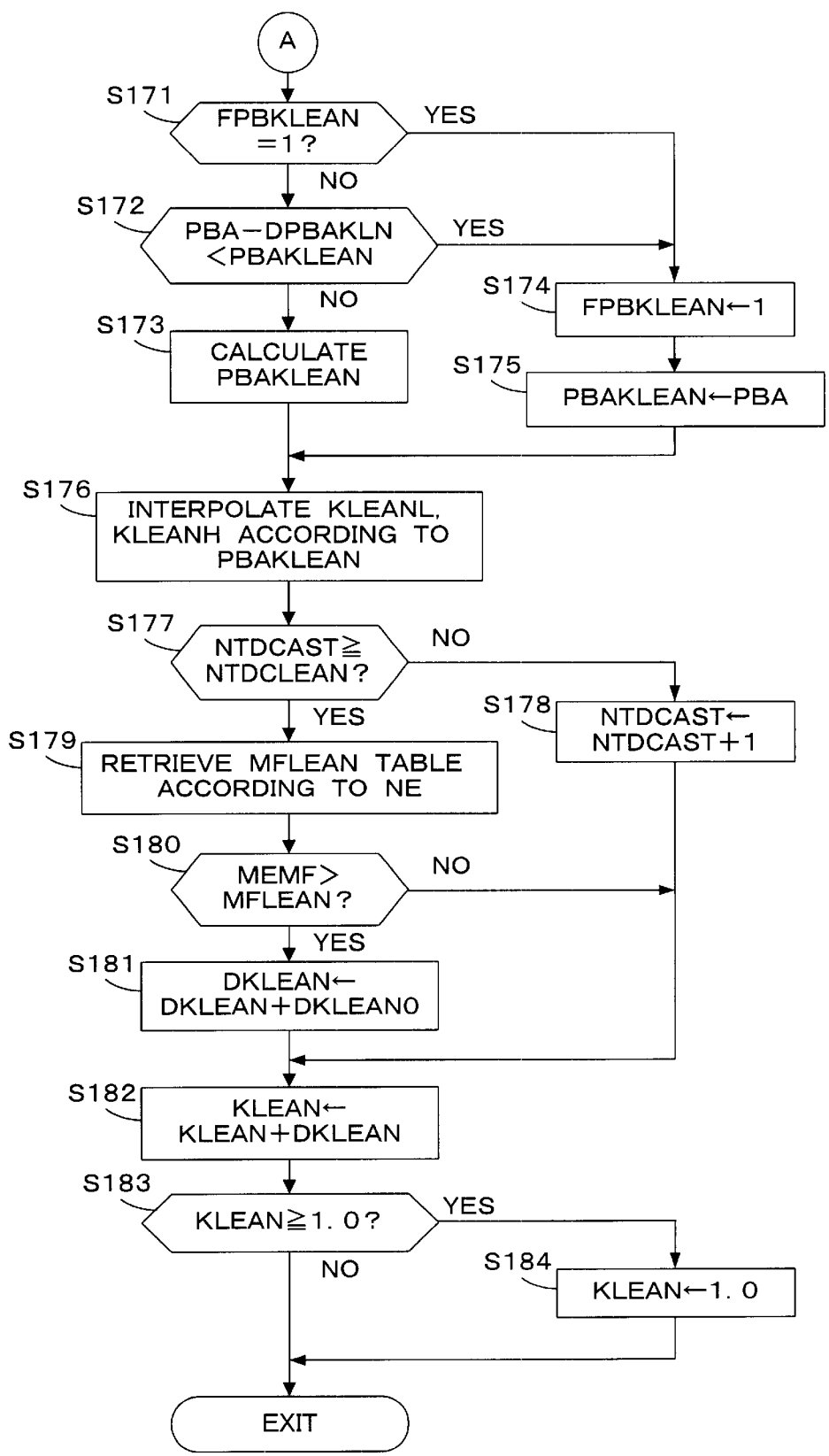
FIG. 16 is a flowchart showing a program calculating a lean control coefficient (KLEAN)

In step S143, a KLEAN calculating processing shown in FIGS. 15 and 16 is executed to calculate a lean control coefficient KLEAN. Then, it is determined whether or not a lean control flag FKLEANST is "1" in step S144. The lean control flag FKLEANST is set in the processing shown in FIG. 15 and indicates when set to "1" that a lean air-fuel ratio control (which will be hereinafter referred to as "lean A/F control") immediately after starting of the engine 1 is performed.

If FKLEANST is "1", indicating that the lean A/F control immediately after starting of the engine 1 is performed, then it is determined whether or not a lean control permission flag FKLSTOK is "1" in step S145. The lean control permission flag FKLSTOK is set in a processing shown in FIG. 17 and indicates when set to "1" that the execution of the lean A/F control is permitted.

If FKLSTOK is "0", indicating that the execution of the lean A/F control is not permitted, then this program is ended. If FKLSTOK is "1", indicating that the execution of the lean A/F control is permitted, then the target air-fuel ratio coefficient KCMD is decremented by a predetermined amount DKLNAST in step S146. Next, it is determined whether or not a resultant new target air-fuel ratio coefficient KCMD is smaller than the lean control coefficient KLEAN (is less than or equal to 1.0) calculated in step S143 (step S147). If KCMD is greater than or equal to KLEAN, then the program is immediately ended. If KCMD is less than KLEAN, then the target air-fuel ratio coefficient KCMD is set to the lean control coefficient KLEAN in step S148. Thereafter, the program is ended.

If FKLEANST is "0" in step S144, then it is determined whether or not the lean control coefficient KLEAN is smaller than 1.0 (step S149). If KLEAN is less than 1.0, which indicates a transient condition from the lean A/F control to the normal control, the program goes to step S148. If KLEAN is "1.0", then the normal control is carried out, i.e., the control processing in which the target air-fuel ratio coefficient KCMD is set according to engine operation parameters including the engine rotational speed NE, the absolute intake pressure PBA, and the engine coolant temperature TW is carried out (step S150).

In steps S146 to S148, the target air-fuel ratio coefficient KCMD is controlled so as to be gradually reduced from 1.0 to the lean control coefficient KLEAN (see FIG. 20(d)).

FIGS. 15 and 16 are a flowchart of the KLEAN calculation processing executed in step S143 shown in FIG. 14. In step S151, it is determined whether or not the engine 1 is starting. If the engine 1 is starting, then various parameters and flags are initialized in step S152.

Specifically, the lean control flag FKLEANST is set to "1". A load correction flag FPBAKLEAN (referred to in step S171 described below) is set to "0", which indicates that an intake pressure PBAKLEAN for calculation of the lean control coefficient, rather than the detected intake pressure PBA, is used as the absolute intake pressure for calculating the lean control coefficient KLEAN. The lean control permission flag FKLSTOK (which is set in the lean control permission determination processing (step S159 shown in FIG. 15)) is set to "0", which indicates that the execution of the lean-burn control is not permitted. The value of a TDC counter NTDCAST, which counts the number of TDC signal pulses (=the number of times that the present processing is carried out) after the completion of staring (cranking) of the engine 1, is set to "0". An additive correction term DKLEAN, which is incremented (step S181) when the engine rotational speed varies greatly and is added to the lean control coefficient KLEAN, is set to "0". Additionally, the intake pressure PBAKLEAN for calculation of the lean control coefficient is set to an initial value PBAKLEAN0. Then, the lean control coefficient KLEAN is set to "1.0" in step S155 and the program is ended.

After completion of starting of the engine 1, the program goes from step S151 to step S153 in which it is determined whether or not a specified failure has already been detected. If a specified failure is not detected, then it is determined whether or not an air-fuel ratio feedback control flag FLAFFB is "0" and a fully closed flag FTHIDLE is "0" (step S154). The flag FLAFFB when set to "1" indicates that the air-fuel ratio feedback control according to the detected value of the LAF sensor 14 is being executed. The fully closed flag FTHIDLE when set to "0" indicates that the throttle valve 3 is substantially fully closed.

If the specified failure has already been detected, the air-fuel ratio feedback control process is being executed (FLAFFB=1), or the throttle valve 3 is not fully closed (FTHIDLE=1), then a preceding value KLEAN(n−1) of the lean control coefficient is set to "1.0" in step S155, then the program moves to step S163. The lean control coefficient KLEAN (present value) may be set to "1.0" in the processing of steps S163 to S165.

If FLAFFB is "0" and FTHIDLE is "0" in step S154, indicating that the air-fuel ratio feedback control is not executed and the throttle valve 3 is substantially fully closed, then it is determined whether or not the lean control flag FKLEANST is "1" (step S156). At first the lean control flag FKLEANST is "1". Next, it is determined whether or not the vehicle is provided with an automatic transmission (step S157). If the vehicle is provided with the automatic transmission, then it is determined whether or not the shift position SFT is in the drive range or the reverse range, i.e., the automatic transmission is in an in-gear condition (step S158). If the automatic transmission is in the in-gear condition, then the program goes to step S163 in order to end the lean A/F control.

In step S163, the lean control coefficient KLEAN (present value) is calculated by adding a predetermined additive value DKLEANNP to the preceding value KLEAN(n−1) of the lean control coefficient. It is determined whether or not the value of the lean control coefficient KLEAN is greater than 1.0 (step S164). If KLEAN is greater than 1.0, then the lean control coefficient KLEAN is set to 1.0 (step S165). Thereafter the program goes to step S166. If KLEAN is less than or equal to 1.0, then the program jumps to step S166, in which the lean control flag FKLEANST is set to "0". Thereafter the program is ended. If FKLEANST is "0" in step S156, then the program goes from step S156 to step S163 in which the processing of gradually increasing the lean control coefficient KLEAN up to 1.0, i.e., the transition processing from the lean A/F control to the normal control.

Figure 17:
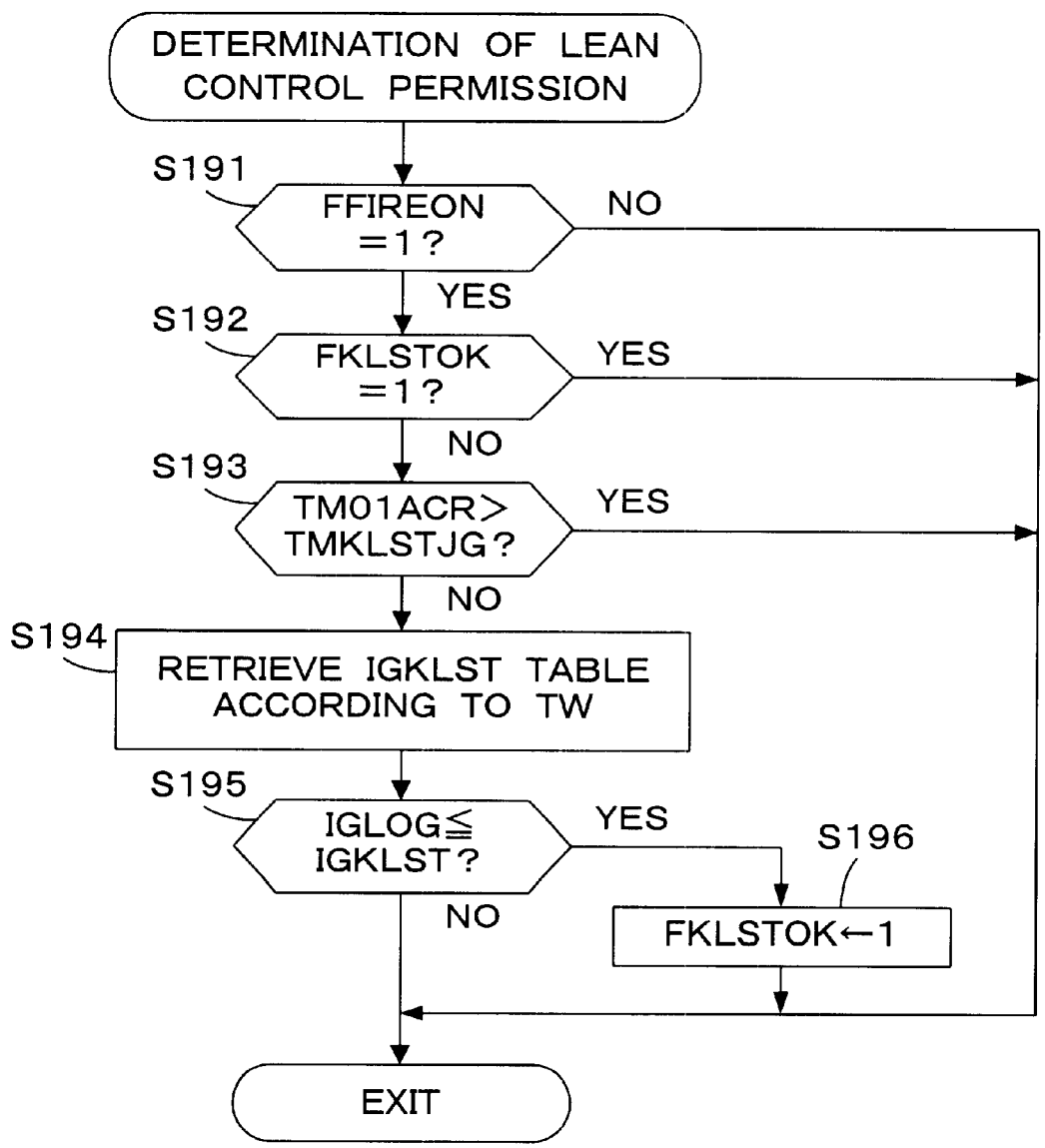
FIG. 17 is a flowchart showing a program of a lean control permission determination.

If the vehicle is provided with a manual transmission or the automatic transmission is not in in-gear condition, then the program moves to step S159 in which the lean control permission determination processing shown in FIG. 17 is executed. In the lean control permission determination processing, the lean control permission flag FKLSTOK is set. In the following step S160, it is determined whether or not the lean control permission flag FKLSTOK is "1". If FKLSTOK is "0", indicating that the lean A/F control is not permitted, the lean control flag FKLEANST is set to "0" (step S161). Thereafter the program goes to step S155.

Figure 18A:
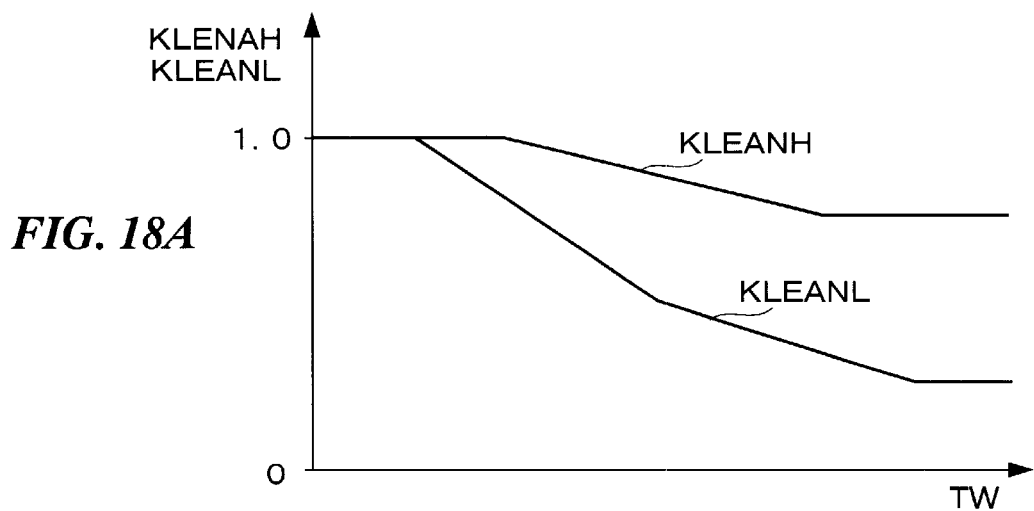
FIGS. 18A, 18B, and 18C are diagrams showing tables used in the programs shown in FIGS. 15, 16, and 17.

If FKLSTOK is "1" in step S160, indicating that the lean A/F control is permitted, then a low-load lean control coefficient KLEANL and a high-load lean control coefficient KLEANH are retrieved from a KLEANLH table shown in FIG. 18A according to the engine coolant temperature TW. The KLEANLH table is set such that as the engine coolant temperature TW becomes higher, the lean control coefficient KLEAN decreases and the coefficient KLEANH is greater than or equal to the coefficient KLEANL. The low-load lean control coefficient KLEANL is set to a value corresponding to a state where the absolute intake pressure PBA is equal to a predetermined low pressure PBL, and the high-load lean control coefficient KLEANH is set to a value corresponding to a state where absolute intake pressure PBA is equal to a predetermined high pressure PBH (>PBL).

In step S171 (FIG. 16), it is determined whether or not a load correction flag FPBKLEAN is "1". At first, the load correction flag FPBKLEAN is "0". Accordingly, it is determined whether or not a value obtained by subtracting a predetermined value DPBKLN from the detected absolute intake pressure PBA is smaller than the intake pressure PBAKLEAN for calculation of the lean control coefficient (step S172). Immediately after the completion of starting of the engine, the absolute intake pressure PBA often becomes high due to the remaining air taken in the intake pipe at the starting. In this case, (PBA−DPBAKLN) is greater than or equal to PBAKLEAN, and the program goes to step S173 in which the detected absolute intake pressure PBA is applied to Eq. (10) to calculate the intake pressure PBAKLEAN for calculation of the lean control coefficient. Thereafter the program goes to step S176:

$$PBAKLEAN = CPBAKLN \times PBA + (1 - CPBAKLN) \times PBAKLEAN \quad (10)$$

where PBAKLEAN on the right side represents a value calculated in the preceding routine and CPBAKLN represents an averaging coefficient set to a value in the range from 0 to 1.

If (PBA−DPBAKLN) is less than PBAKLEAN in step S172, then the load correction flag FPBKLEAN is set to "1" (step S174), and the intake pressure PBAKLEAN for calculation of the lean control coefficient is set to the detected value PBA (step S175). Thereafter the program goes to step S176. If FPBKLEAN is set to "1" in step S174, then the program goes from step S171 to step S174. Subsequently, the processing from step S171 directly to step S174 is executed.

In step S176, the lean control coefficient KLEAN is calculated by interpolating the low-load lean control coefficient KLEANL and the high-load lean control coefficient KLEANH which have been calculated in step S162, according to the intake pressure PBAKLEAN for calculation of the lean control coefficient. In this manner, the lean control coefficient KLEAN according to the engine coolant temperature TW and the absolute intake pressure PBA is calculated. The intake pressure PBAKLEAN for calculation of the lean control coefficient is used because the lean control coefficient KLEAN would be greater than an optimum value, if the detected value PBA were directly used when the absolute intake pressure PBA is high due to remaining air taken in at starting of the engine.

Figure 18B:
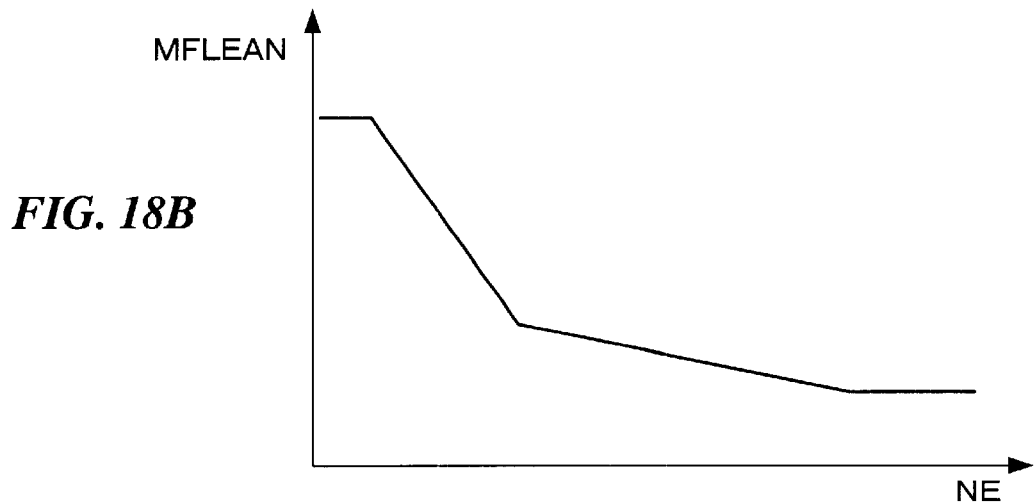

In step S177, it is determined whether or not the value of the TDC counter NTDCAST is equal to or greater than a predetermined value NTDCLEAN. Since the value of the TDC counter NTDCAST is smaller than the predetermined value NTDCLEAN at first, the TDC counter NTDCAST is incremented by "1" (step S178), and the program goes to step S182. When the value of the TDC counter NTDCAST subsequently becomes equal to or greater than the predetermined value NTDCLEAN, then the program goes from step S177 to step S179 in which a rotational speed variation threshold MFLEAN to be referred to in step S180 is retrieved from an MFLEAN table shown in FIG. 18B according to the engine rotational speed NE. The MFLEAN table is set such that as the engine rotational speed NE increases, the rotational speed variation threshold MFLEAN decreases.

In step S180, it is determined whether or not a rotational speed variation parameter MEMF which is calculated in another processing (not shown) and indicative of a rotational speed variation of the engine 1, is greater than the rotational speed variation threshold MFLEAN calculated in step S179. The rotational speed variation parameter MEMF is defined according to Eq. (11):

$$MEMF = |(MSME(n) - MSME(n-1)/KMSSLB|\qquad(11)$$

Figure 19:
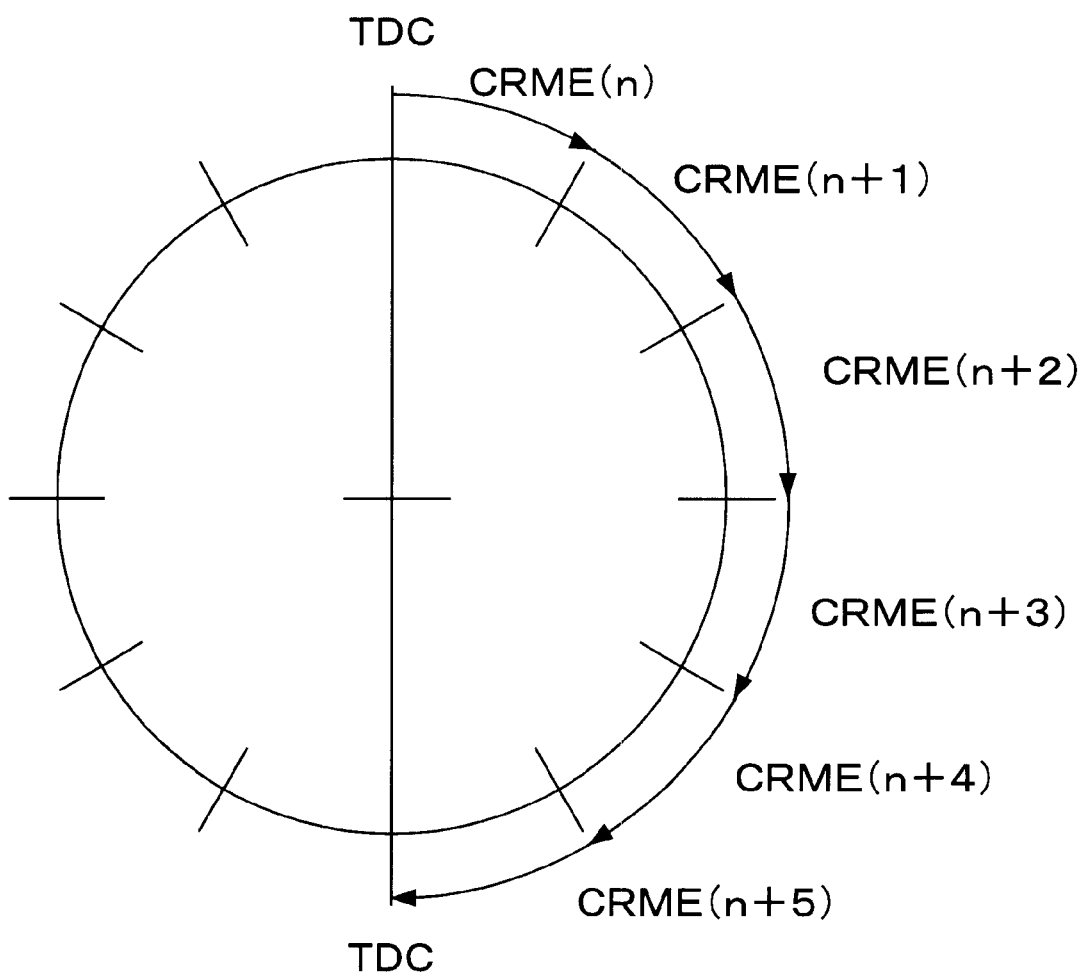
FIG. 19 is a diagram illustrating a parameter indicative of engine rotational speed variation.

In Eq. (11), KMSSLB is a coefficient set in inverse proportion to the engine rotational speed NE and MSME(n) is an average value of time intervals at which CRK signal pulses are generated, i.e., periods CRME(n) each required for the crankshaft to turn 30 degrees, as shown in FIG. 19. The average value MSME(n) and the period CRME(n) are defined according to the following Eqs. (12), (13):

$$CR12ME(n) = \sum_{i=-11}^{0} CRME(n+i)/12 \qquad(12)$$

$$MSME(n) = \sum_{i=-5}^{0} CR12ME(n+i)/6 \qquad(13)$$

More specifically, a first average value CR12ME(n) is calculated as an average value of 12 CRME values from the value CRME(n−11) measured 11 cycles before to the latest measured value CRME(n) of the time interval CRME(n) according to Eq. (12), and then a second average value MSME(n) is calculated as an average value of 6 CR12ME values from the value CR12ME(n−5) calculated 5 cycles before to the latest calculated value CR12ME(n) of the first average value according to Eq. (13). The second average value MSME(n) is then applied to Eq. (11) to calculate the rotational speed variation parameter MEME The rotational speed variation parameter MEMF thus calculated increases as the combustion state of the engine 1 becomes deteriorated, and hence is used as a parameter indicative of the combustion state of the engine 1.

Generally, as the air-fuel ratio is made leaner, the combustion becomes gradually unstable, which increases the rotational speed variation parameter MEME Referring back to FIG. 16, if MEMF is less than or equal to MELEAN in step S180, indicating that the combustion state of the engine 1 is stable, then the program goes to step S182. If MEMF is greater than MELEAN in step S180, indicating that the combustion state of the engine 1 is unstable, then the additive correction term DKLEAN is incremented by a predetermined value DKLEAN0 in step S181. Thereafter the program goes to step S182.

In step S182, the additive correction term DKLEAN is set to the lean control coefficient KLEAN, thus updating the lean control coefficient KLEAN. Then, it is determined whether or not the lean control coefficient KLEAN is equal to or greater than 1.0 in step S183. If KLEAN is less than 1.0, then the program is ended. If KLEAN is greater than or equal to 1.0, then the lean control coefficient KLEAN is set to 1.0 in step S184. Thereafter the program is ended.

According to the KLEAN calculating process shown in FIGS. 15 and 16, as described above, when the lean A/F control is permitted immediately after starting of the engine, the lean control coefficient KLEAN is set according to the engine coolant temperature TW and the absolute intake pressure PBA (the intake pressure PBAKLEAN for calculation of the lean control coefficient) (steps S162, S171 through S176). When the rotational speed variation of the engine 1 is large, the additive correction term DKLEAN is increased and added to the lean control coefficient KLEAN (steps S179 through S182). Therefore, an optimum lean air-fuel ratio can be set according to the operating condition of the engine 1.

FIG. 17 is a flowchart of the lean control permission determination processsing executed in the step S159 of FIG. 16. In step S191, it is determined whether or not the FIRE mode flag FFIREON is "1". If FFIREON is "1", indicating the engine operation mode is the FIRE mode, then it is determined whether or not the lean control permission flag FKLSTOK has already been set to "1" (step S192). If FKLSTOK is "0", it is determined whether or not the upcount timer TM01ACR, which measures a time that has elapsed from the completion of starting (cranking) of the engine 1, exceeds a predetermined time TMKLSTJG (e.g., 2 seconds) (step S193). If FFIREON is "0", indicating the engine operation mode is not the FIRE mode, or if FKLSTOK=1, indicating that the lean A/F control has already been permitted, or if TM01ACR is greater than TMKLSTJG, indicating that the predetermined time TMKLSTJG has elapsed, then the program is ended.

Figure 18C:
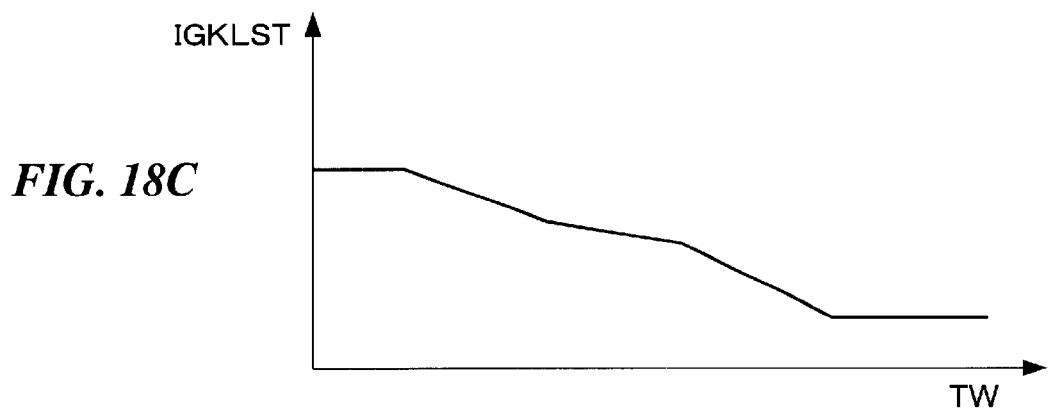

If TM01ACR is less than or equal to TMKLSTJG in step S193, then a fuel property determining threshold IGKLST (<0) is retrieved from an IGKLST table shown in FIG. 18C according to the engine coolant temperature TW (step S194). The IGKLST table is set such that as the engine coolant temperature TW is higher, the fuel property determining threshold IGKLST is smaller.

In step S195, it is determined whether or not the ignition timing IGLOG is equal to or less than the fuel property determining threshold IGKLST. If IGLOG is less than or equal to IGKLST, indicating that the ignition timing IGLOG is retarded down to the fuel property determining threshold IGKLST or further, then the fuel being used is determined to be a gasoline of normal volatility (normal gasoline), and the lean control permission flag FKLSTOK is set to "1" (step S196), to thereby permit the lean A/F control. If IGLOG is greater than IGKLST, indicating that the ignition timing IGLOG is not retarded to the fuel property determining threshold IGKLST, then the fuel being used is determined to be a gasoline of low volatility, and the lean control permission flag FKLSTOK is set to "0". Thereafter, the program is ended.

According to the present embodiment, when the retard amount of the ignition timing is small in the FIRE mode, the fuel being used is determined to be the gasoline of low volatility, and the lean A/F control process is not permitted, in view of the following fact:

If the gasoline of low volatility is used, the amount of fuel that is actually taken into the combustion chamber is small when the fuel is injected into the intake pipe, and the output torque of the engine is smaller than the output torque corresponding to the normal gasoline. Therefore, the retard amount of the ignition timing which is necessary for making the engine rotational speed NE coincide with the target rotational speed is smaller than the retard amount corresponding to the normal gasoline. Therefore, according to the present embodiment, it is possible to smoothly start the engine even when a gasoline of very low volatility is used.

Further, the fuel property determining threshold IGKLST is set according to the engine coolant temperature TW. Specifically, as the engine coolant temperature TW becomes higher, the fuel property determining threshold IGKLST is made smaller. Consequently, a gasoline of low volatility can accurately be determined irrespective of the engine coolant temperature TW.

FIGS. 20A through 20D are timing charts illustrating the lean control permission determination processing shown in FIG. 17. FIGS. 20A through 20D show how the ignition timing IGLOG, the engine rotational speed NE, the lean control permission flag FKLSTOK, and the target air-fuel ratio coefficient KCMD change. In these figures, the solid-line corresponds to the ordinary gasoline, and the broken-line corresponds the gasoline of low volatility. In FIG. 20B, only the solid-line is shown because the engine rotational speed remains substantially the same irrespective of whether the normal gasoline or the gasoline of low volatility is used.

According to the lean control permission determination processing shown in FIG. 17, if the gasoline is of normal volatility, the ignition timing IGLOG is retarded according to the above feedback control of the ignition timing, and becomes equal to or smaller than the fuel property determining threshold IGKLST at a time t11 bofore the predetermined determination period TMKLSTJG elapses from the time t11 of the completion of starting the engine. Accordingly, the lean control permission flag FKLSTOK is set to "1". As a result, the lean control coefficient KLEAN is set to a value smaller than 1.0, and the target air-fuel ratio coefficient KCMD is gradually reduced to the lean control coefficient KLEAN, and maintained at the value of the lean control coefficient KLEAN.

On the other hand, if the gasoline is of low volatility, the ignition timing IGLOG is not retarded to the fuel property determining threshold IGKLST until the predetermined time TMKLSTJG elapses from the time t1 of completion of starting the engine. Then, the lean control permission flag FKLSTOK is kept "0" and the target air-fuel ratio coefficient KCMD is held at an initial value (=1.0).

According to the above embodiment, as described above, the fuel property is determined based on a change in the ignition timing IGLOG due to the execution of the catalyst temperature rise acceleration control. Therefore, it is not necessary to add a fuel property sensor, and complicated processings for determining the fuel property are not necessary. The lean A/F control according to the property of the fuel being used can be performed with a simpler structure, to thereby effectively realize the early temperature rise of the catalyst and reduction of HC emission.

In the present embodiment, the auxiliary air passage 17 and the auxiliary air control valve 18 serve as part of the intake air amount control means, and the ECU 5 serves as part of the intake air amount control means, the ignition timing control means, the catalyst temperature rise accelerating means, and the lean control means. More specifically, the processings shown in FIGS. 2, 3, 5, and 7 correspond to the intake air amount control means, the processings shown in FIGS. 8, 9 10, and 12 correspond to the ignition timing control means, and steps S143–148 shown in FIG. 14 and the processings shown in FIGS. 15–17 correspond to the lean control means.

The present invention is not limited to the above embodiment, but may be subject to various modifications. For example, in the above embodiment, a gasoline of very low volatility is determined based on the relationship between the magnitudes of the ignition timing IGLOG and the fuel property determining threshold IGKLST Alternatively, the property of a fuel (volatility) may be determined according to the retard amount |GFPI| of the ignition timing IGLOG in the FIRE mode (more specifically, the retard amount within a period until the predetermined determination period TMKLSTJG elapses from the time of the completion of staring the engine), and the lean control coefficient KLEAN may be set according to the determined property. In this case, as the retard amount |IGFPI| is smaller, the lean control coefficient KLEAN is made larger to reduce the degree of making the air-fuel ratio leaner.

In the above embodiment, if the fuel being used is a gasoline of low volatility, the lean control coefficient KLEAN is held at 1.0 (i.e. the lean A/F control process is not performed). Alternatively, the degree of making the air-fuel ratio leaner may be made smaller than the degree corresponding to the normal gasoline (the lean control coefficient KLEAN may be set to a value which is larger than the value corresponding to the normal gasoline and smaller than 1.0), and then the lean A/F control may be performed.

In the above embodiment, the property of a fuel is determined based on whether or not the ignition timing IGLOG is larger than the fuel property determining threshold IGKLST Alternatively, the property of a fuel may be determined by comparing the retard amount |IGFPI| with respect to the normal control value of the ignition timing (=IGMAP+IGCR) and a predetermined retard amount (=IGKLST+IGMAP+IGCR) corresponding to the fuel property determining threshold IGKLST.

While the preferred embodiment of the present invention has been described using the specific terms, such description is for illustrative purposes only, and it is to be understood that changes and variations may be made without departing from the spirit or scope of the following claims.

What is claimed is:

1. A control system for an internal combustion engine having an exhaust system provided with a catalyst, said control system comprising:

intake air amount control means for controlling an intake air amount of said engine;

ignition timing control means for controlling ignition timing of said engine;

catalyst temperature rise accelerating means cooperating with the intake air amount control means for increasing the intake air amount immediately after starting of said engine and cooperating with the ignition timing control means to retard the ignition timing to make a rotational speed of said engine coincide with a target rotational speed; and lean control means for controlling the air-fuel ratio of an air-fuel mixture supplied to said engine to a lean region with respect to the stoichiometric ratio immediately after starting of said engine;

wherein said lean control means suppresses the degree of making the air-fuel ratio leaner when the retard amount of the ignition timing controlled by the ignition timing control means during the operation of the catalyst temperature rise accelerating means is less than a predetermined retard amount.

2. A control system according to claim 1, wherein said lean control means sets the predetermined retard amount according to the temperature of said engine.

3. A control system according to claim 1, wherein said lean control means sets the degree of making the air-fuel ratio leaner, according to the temperature of said engine and the load on said engine.

4. A control system according to claim 3, wherein said lean control means has averaging means for averaging a load parameter value indicative of the load on said engine, and sets the degree of making the air-fuel ratio leaner, using an averaged value calculated by said averaging means when the load parameter value is greater than the averaged value by a predetermined value.

5. A control system according to claim 1, wherein said lean control means has combustion state parameter calculating means for calculating a combustion state parameter indicative of the combustion state of said engine, and said lean control means suppresses the degree of making the air-fuel ratio leaner when the combustion state parameter indicates deterioration of the combustion state.

6. A control system for an internal combustion engine having an exhaust system provided with a catalyst, said control system comprising:

intake air amount control means for controlling an intake air amount of said engine;

ignition timing control means for controlling ignition timing of said engine;

catalyst temperature rise accelerating means cooperating with the intake air amount control means for increasing the intake air amount immediately after starting of said engine and cooperating with the ignition timing control means to retard the ignition timing to make a rotational speed of said engine coincide with a target rotational speed; and lean control means for controlling the air-fuel ratio of an air-fuel mixture supplied to said engine to a lean region with respect to a stoichiometric ratio immediately after starting of said engine;

wherein said lean control means has fuel property determining means for determining a property of the fuel being used according to the retard amount of the ignition timing controlled by the ignition timing control means during the operation of the catalyst temperature rise accelerating means, and controls the degree of making the air-fuel ratio leaner according to the property of the fuel determined by said fuel property determining means.

7. A control system according to claim 6, wherein said fuel property determining means determines the property of the fuel within a predetermined determination period from the completion of starting of said engine.

8. A control system according to claim 6, wherein said lean control means sets the degree of making the air-fuel ratio leaner, according to the temperature of said engine and the load on said engine.

9. A control system according to claim 8, wherein said lean control means has averaging means for averaging a load parameter value indicative of the load on said engine, and sets the degree of making the air-fuel ratio leaner, using an averaged value calculated by said averaging means when the load parameter value is greater than the averaged value by a predetermined value.

10. A control system according to claim 6, wherein said lean control means has combustion state parameter calculating means for calculating a combustion state parameter indicative of the combustion state of said engine, and said lean control means suppresses the degree of making the air-fuel ratio leaner when the combustion state parameter indicates deterioration of the combustion state.

* * * * *